US009229619B1

(12) United States Patent
Fugate

(10) Patent No.: US 9,229,619 B1
(45) Date of Patent: Jan. 5, 2016

(54) AMBIENT ACTIVITY MONITORS FOR HIDDEN COMPUTING SYSTEM AND PROCESS METADATA

(71) Applicant: Sunny J. Fugate, San Diego, CA (US)

(72) Inventor: Sunny J. Fugate, San Diego, CA (US)

(73) Assignee: THE UNITED STATES OF AMERICA AS REPRESENTED BY THE SECRETARY OF THE NAVY, Washington, DC (US)

( * ) Notice: Subject to any disclaimer, the term of this patent is extended or adjusted under 35 U.S.C. 154(b) by 288 days.

(21) Appl. No.: 13/767,131

(22) Filed: Feb. 14, 2013

(51) Int. Cl.
*G06F 3/048* (2013.01)
*G06F 3/0484* (2013.01)
*G06F 3/0481* (2013.01)

(52) U.S. Cl.
CPC ............ *G06F 3/0484* (2013.01); *G06F 3/0481* (2013.01)

(58) Field of Classification Search
CPC .. G09G 5/14; H04L 63/1408; H04L 63/1416; G06F 3/0481
USPC .............................. 715/778, 781, 772; 726/23
See application file for complete search history.

(56) References Cited

U.S. PATENT DOCUMENTS

| 7,185,367 | B2 | 2/2007 | Munson |
| 2003/0076369 | A1 | 4/2003 | Resner |
| 2007/0130399 | A1 * | 6/2007 | Anderson et al. ............... 710/62 |
| 2008/0170120 | A1 | 7/2008 | Senior |
| 2009/0327884 | A1 * | 12/2009 | Parks et al. ................... 715/700 |

OTHER PUBLICATIONS

Abdullah, K., Lee, C., Conti, G., Copeland, J., and Stasko, J., "IDS Rainstorm: Visualizing IDS Alarms", Proceedings of IEEE Visualization for Computer Security 2005 (VizSEC '05), pp. 1-10, Oct. 2005.
Plaue, C. and Stasko, J., "Animation in a Peripheral Display: Distraction, Appeal, and Information Conveyance in Varying Display Configurations", Proceedings of Graphics Interface '07, pp. 135-142, May 2007.
Shami, N., Leshed, G., & Klein, D. (2005). "Context of use evaluation of peripheral displays (CUEPD)". In Human-Computer Interaction—Interact 2005, Proceedings (vol. 3585, pp. 579-587). Presented at the Human-Computer Interaction—Interact 2005, Proceedings.

(Continued)

*Primary Examiner* — Haoshian Shih
(74) *Attorney, Agent, or Firm* — SPAWAR Systems Center Pacific; Kyle Eppele; Ryan J. Friedl

(57) ABSTRACT

A computing system having attached display devices comprising a primary display area controlled by a corresponding attached display device; a running software application coupled to the primary display area, the software application being actively manipulated by a user and the corresponding primary display area being actively perceived by the user; a plurality of software measurement mechanisms, each coupled to hidden internal states of the running software application; data mapping functions each coupled to a plurality of software measurement mechanisms; one or more secondary display areas each controlled by a corresponding attached display device, where each secondary display area does not occlude or obscure the primary display area; one or more display algorithms, each which couples secondary display areas to one or more data mapping functions, in which the secondary display area shows representations of the hidden internal states via the software measurement mechanisms, data mapping functions, and display algorithms.

18 Claims, 26 Drawing Sheets

(56) References Cited

OTHER PUBLICATIONS

Fink, G. A., Muessig, P., & North, C. (2005). "Visual correlation of host processes and network traffic". Visualization for Computer Security, 2005. (VizSEC 05). IEEE Workshop on, 11-19. doi:10.1109/VIZSEC.2005.1532061.

Komlodi. (2005). "A user-centered look at glyph-based security visualization". Visualization for Computer Security, 2005. (VizSEC 05). IEEE Workshop on, 21-28. doi:10.1109/VIZSEC.2005.1532062.

Maglio, P. P., & Campbell, C. S. (2000). "Tradeoffs in Displaying Peripheral Information". In the SIGCHI conference (pp. 241-248). Presented at the the SIGCHI conference, New York, New York, USA: ACM Press. doi:10.1145/332040.332438.

Ishii, H., & Ullmer, B. (1997). Tangible Bits: Towards Seamless Interfaces between People, Bits and Atoms. In the SIGCHI conference, towards seamless interfaces between people, bits and atoms (pp. 234-241). Presented at the the SIGCHI conference, New York, New York, USA: ACM Press. doi:10.1145/258549.258715.

Koike, H., Ohno, K., & Koizumi, K. (2005). Visualizing cyber attacks using IP matrix. Visualization for Computer Security, 2005. (VizSEC 05). IEEE Workshop on, 91-98. doi:10.1109/VIZSEC.2005.1532070.

Ren, P., Gao, Y., Li, Z., Chen, Y., & Watson, B. (2005). IDGraphs: intrusion detection and analysis using histographs. Visualization for Computer Security, 2005. (VizSEC 05). IEEE Workshop on, 39-46. doi:10.1109/VIZSEC.2005.1532064.

\* cited by examiner

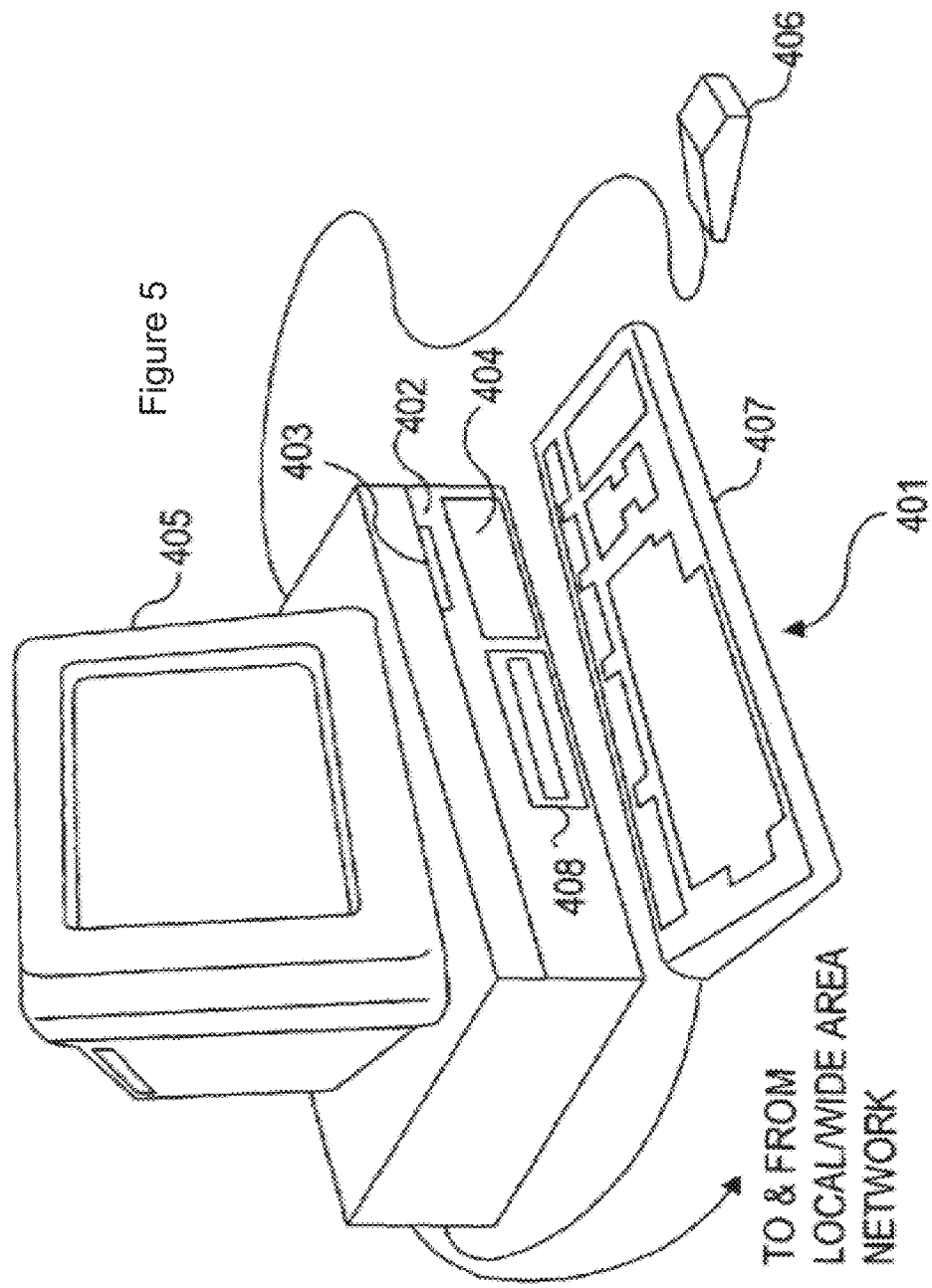

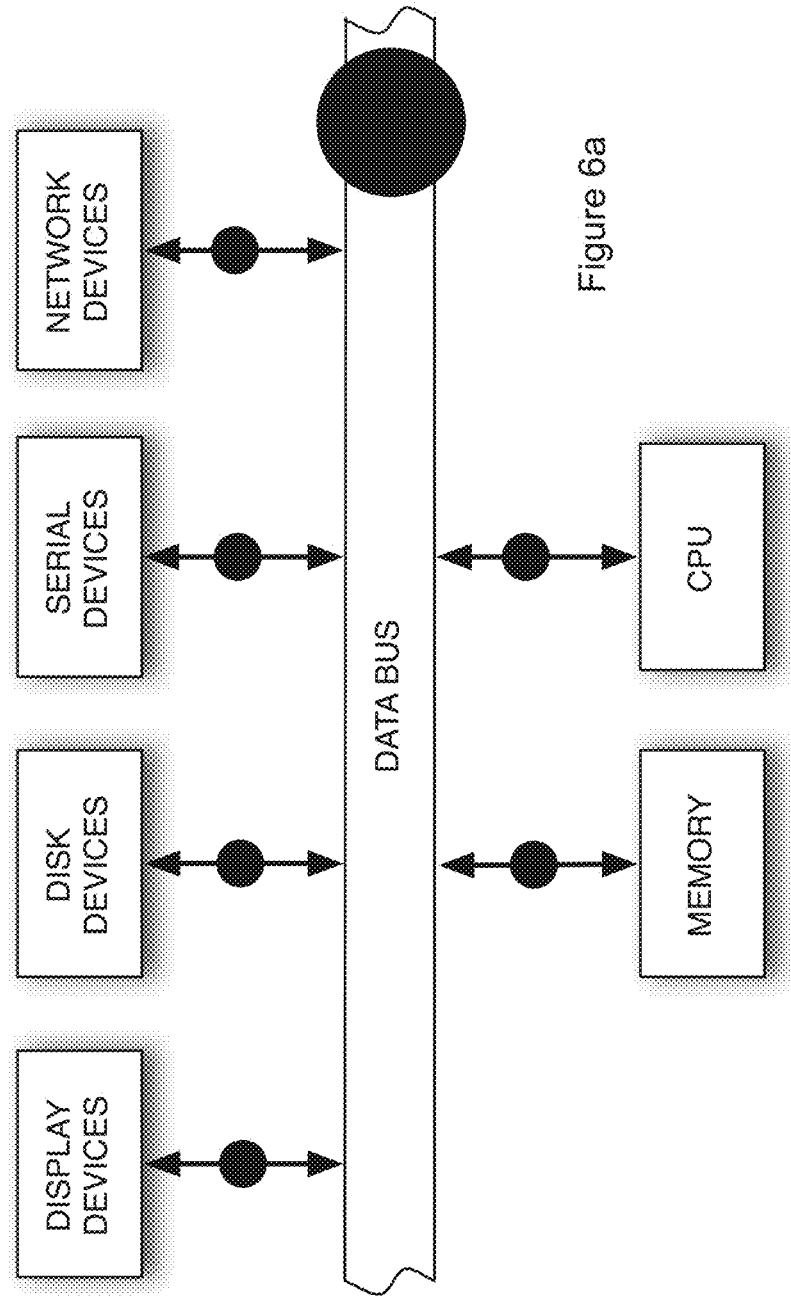

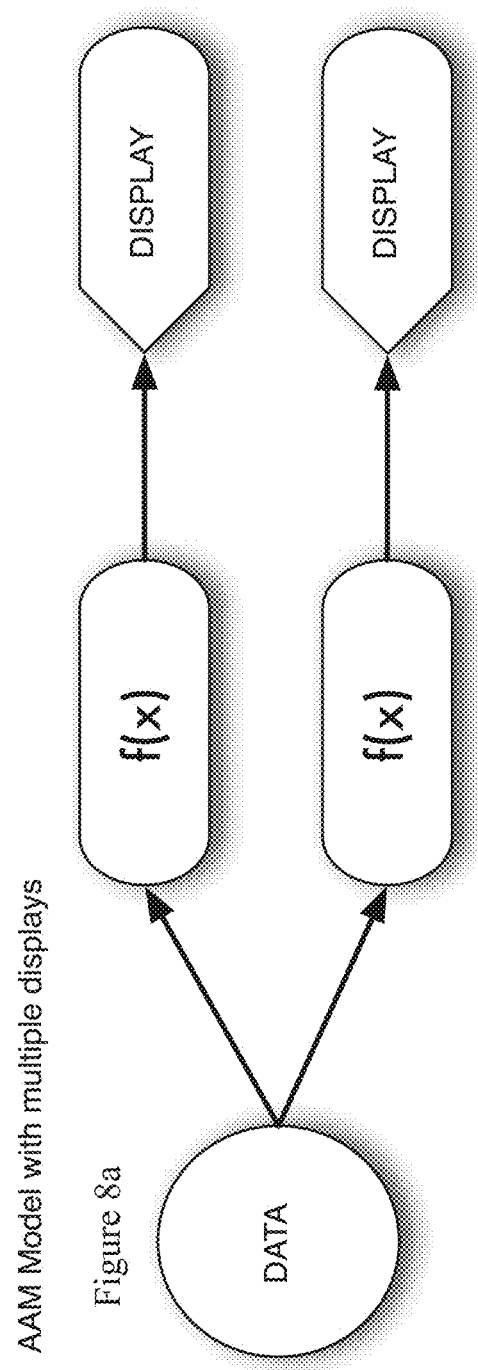

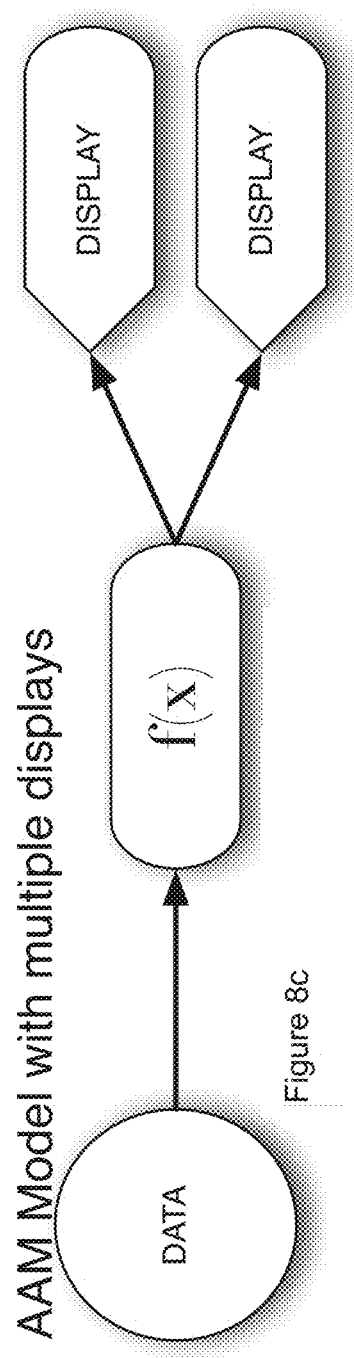

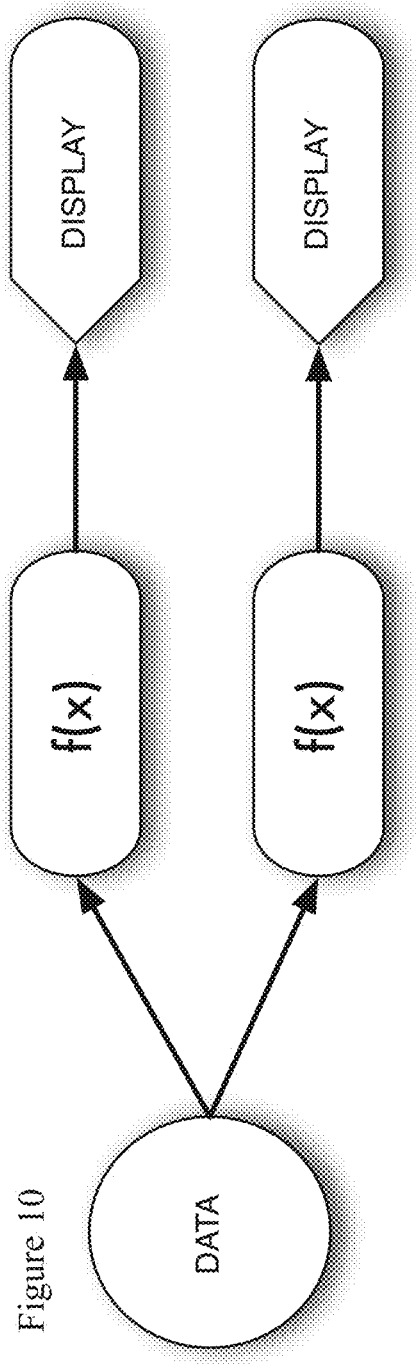

AMBIENT ACTIVITY MONITORS FOR HIDDEN COMPUTING SYSTEM AND PROCESS METADATA

FEDERALLY-SPONSORED RESEARCH AND DEVELOPMENT

This invention (Navy Case NC 101,481) is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-5118; email ssc_pac_t2@navy.mil.

BACKGROUND OF THE INVENTION

Viruses, malicious code, and other computer threats are rapidly evolving and are becoming more and more difficult to detect. Automated mechanisms to ensure safety area also evolving, but existing methods commonly detect what has already happened. Anti-virus detects the post-mortem infection of a system. An intrusion detection system identifies events which have already occurred. Such systems are also generally unable to prevent situations which rely on human culpability. Often the first and last defenses are decisions made by the computer user. However, sophisticated ruses are used to fool users into making precisely the decisions necessary for the exploitation to occur. Even though threats to computing systems have become progressively more adept at exploiting human users, little work has been performed in providing human users with better information for decision making regarding computer security. Much of this threat is reliant on the user lacking sufficient information regarding system state. To cure these failings the last two decades has provided little more than icons denoting software certification and a plethora of dialog decision boxes.

Within conventional human-machine interfaces of computing displays we rely almost exclusively on primary attentional information streams. The peripheral is used, but generally limited to event notification in the form of binary indicators of interesting information (time and date, weather, etc.) or the need for user action or response (e.g. emblems on application icons, notifiers in the status-bar of active processes). Peripheral information displays have been shown to increase a user's awareness of supplemental knowledge. Nonetheless, only a handful of iconic and graphical display elements are seen within modern computer interfaces providing peripheral information. These are akin to road signs within physical environments which convey meaning in a direct fashion. The ambient activity monitor as conceived within this invention conveys meaning indirectly via correlation of the display with the state and interactions with a computing display. To use a similar analogy, this is akin to road, engine, and tire noise providing peripheral cues as to the state of an automobile as it races around a sharp corner, engine revving and tires chirping.

When a user interacts with a computing device the underlying state of the machine is generally hidden and only the intended output of a set of active computing tasks is visible. This differs significantly from traversal of a physical environment (e.g. walking down a sidewalk) where the rich environmental milieu provides constant and myriad peripheral cues to the active state of the local environment (e.g. footsteps of other pedestrians, automobile noises, sounds of children playing). These environmental cues, while peripheral to the task at hand (e.g. walking to a particular destination), are often necessary for doing so safely (e.g. avoiding a speeding car, or a child on a skateboard). We know that threat avoidance in real environments relies on peripheral information. Further, the peripheral information is not a measurement or abstraction of the threat itself, but information which can be used to predict potential threats (whether real or imagined).

Indicators of emerging or current threats to a computing environment are currently provided to a user in several ways.
a) Indicators may be provided early, prior to an event which warns us to specific threats (as in an alert or dialog box).
b) Indicators may be provided late, after an event (as in the output of an intrusion detection system).
c) Indicators may also be provided in the form of a near real-time measurement of network connection, process, or other machine states (such as a process monitor).

In some cases, real-time measurements (such as memory and CPU-time of a running process) may provide subtle hints that something may be awry in much the same way as peripheral cues in natural environments. However, the conventional approach for process monitoring is generally limited for several reasons:

non-peripheral, demanding a user's full attention
represent intended cues and as such reflect an abstraction and judgment of underlying machine state rather than simply a representation of the machine state itself.
significantly simplify and aggregate the representation of the machine state for the purposes of exposing particular measurement semantics (i.e. CPU usage percentage, counts of disk reads/writes).
generally do not correlate precisely with the activities of the user or underlying system state, often being delayed by seconds for purposes of decreasing the process monitor's resource demands.

There also exist unintended peripheral cues within modern computing system (such as unexpected slowdown of a software application, the erratic behavior of running processes, disk drive noises, fan noises). However, it is the intent of good software design to eliminate these unintended effects. The computing environment is designed to be sterile in respect to unintended effects. These effects represent bugs or other software deficiencies.

It is important to note that neither the intended or unintended peripheral cues have a rich semantics to tie them to particular user or system activities. If a software application hangs due to internal defect or system malfunction, the only peripheral cue to the user may be that the software appears unresponsive. When a software application is infected by malicious code there are often no peripheral cues until long after data has been destroyed or stolen. And while existing software and system instrumentation mechanisms can expose these (and other) system defects and security problems in a direct fashion, use of such instrumentation mechanisms completely disrupts the user's primary purpose for using the computing system. While some users may be willing to direct their attention to a process monitor and examine the memory usage of a particular software application, unless the user is using sophisticated debuggers and software instrumentation, they do not get any deeper knowledge as to why the memory usage is at a particular level or what the software is doing internally. If a user did wish to understand the reason for the software problem they would no longer be using the computing system as originally intended, spending all of their time addressing the nuances of the underlying software and system states. The system activity and software instrumentation mechanism would become the user's primary task.

SUMMARY OF THE INVENTION

The present invention addresses these shortcomings by providing a system which unobtrusively augments the environment of the computing system display areas and physical environment with ambient displayed representations of the hidden states of the user's primary task. When the user switches to a new primary tasks, the displayed representation changes to represent the new task. The display functions in a way that does not visually obscure or otherwise contend for a user's attention, being visually or temporally adjacent to the display of the primary task or being projected (or otherwise located) within the physical environment. In the invention, the user is not being tasked to directly examine the hidden state representations. As such, they can continue their work on their primary task without interruption. As the user regularly uses software which is instrumented in this manner the user becomes familiar with the correlations between their interactions with a primary task software application and the ambient hidden state representations. The ambient hidden state representations serve as a sort of landscape that is navigated each time a software application is used. The invention provides a deterministic mapping between input states and output representation. Each time a user performs a given task the ambient representation will be predictable.

The user may learn these associations without actively pursuing to understand the correlations. Such passive learning allows a user to be both consciously and subconsciously cued to differences between their learned expectations and the current ambient display representations. More adept users may choose to actively pursue understanding the correlations between the ambient display representations and their primary task. Active learning will allow a user to reason about how their primary task software is operating but at the cost of additional perceptual attention. This allows both novice user and adept users to utilize the same basic approach for monitoring the hidden states of their computing environment. Both types of users will have a better perceptual awareness of internal computer and software states. In this way users can be made aware of changes in the hidden internal states of software which may indicate potential threats or other issues.

The system is constructed to use any type of display method, whether it be visual, auditory, haptic, or kinesthetic. Multiple simultaneously display methods can allow greater fidelity and may represent a larger number of hidden states. Additionally, some modalities are better suited for representing different types of information or different environments. An office environment may use a ambient lighting as a display method, whereas a handheld computing device may use a vibrating haptic display method. Some hidden states may easily map to colors and shapes, whereas other hidden states may be most easily mapped to sounds, movements, or other display modalities.

BRIEF DESCRIPTION OF THE DRAWINGS

The invention will be more fully described in connection with the annexed drawings, where like reference numerals designate like components, in which:

FIG. 5 presents conventional computing system hardware.

FIG. 6a presents a block diagram of simplified computing system architecture where each black dot represents a potential data source for use by an ambient activity monitor.

FIGS. 8a, 8b, and 8c present simple functional models of an AAM.

FIGS. 9 and 10 present use of multiple mapping functions.

DETAILED DESCRIPTION OF THE PREFERRED EMBODIMENTS

Figure 1:
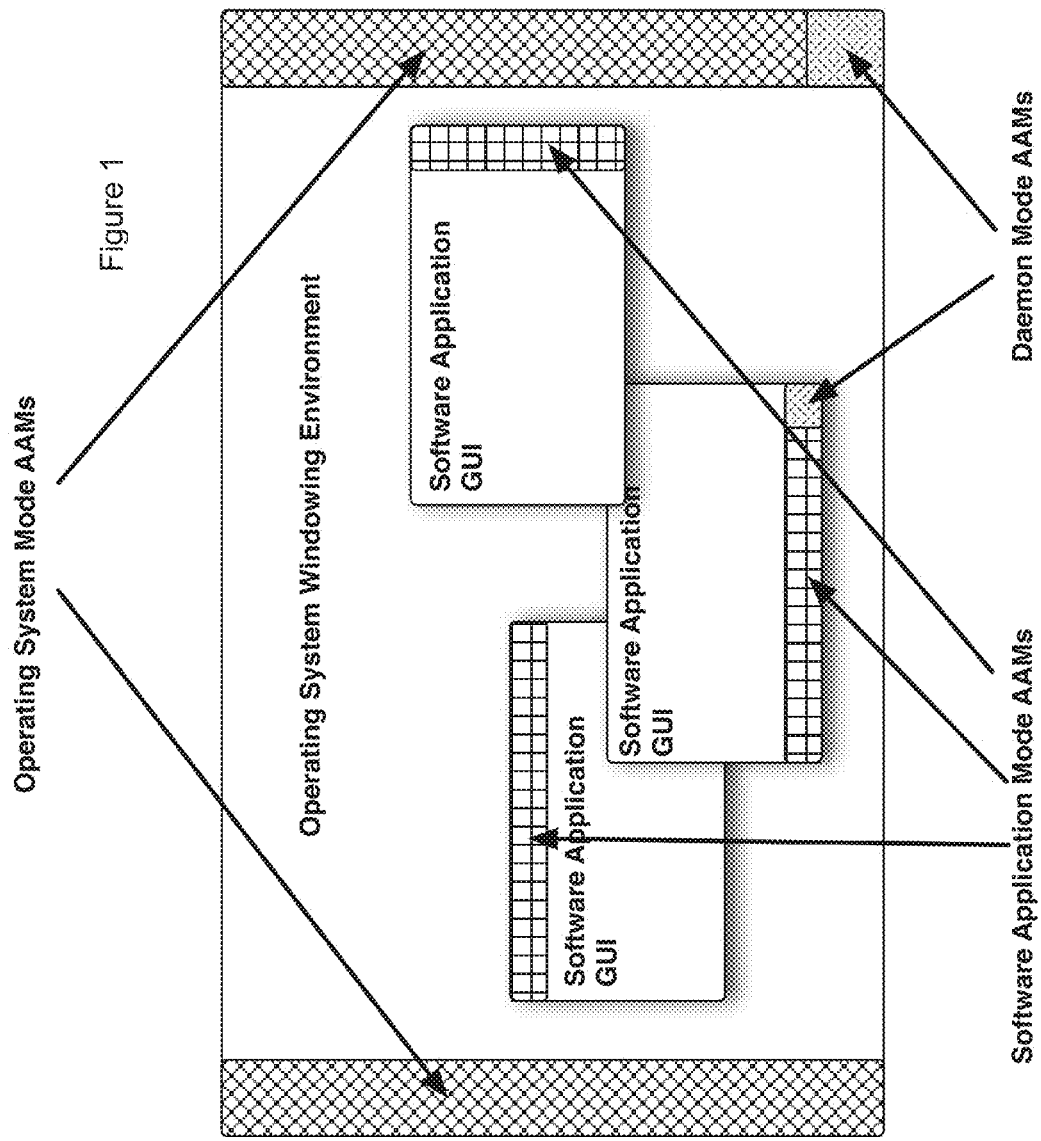
FIG. 1 shows use of Ambient Activity Monitors (AAMs) in a software application environment.

It is one purpose of this invention to provide comprehensive supplemental peripheral information concerning software and operating system states so that a human user can better perceive, predict, and adapt to emerging threats to their computing environment. This invention applies the theory of "ambient" or "peripheral" information displays to the display of real-time system and process metadata such that the displayed information can be used as event predictors (of threats) by a human computer user while not demanding user attention. The basic concept is that the user is better able to predict threats when supplemental information about the "computing environment" is peripherally available. The ambient information display is non-obtrusive and provides predictable visual, auditory, and kinesthetic cues that relate to the flow of information within and between computing systems. The invention consists of the method and software apparatus necessary for constructing such a system.

As described above, the conventional methods of displaying real-time computing-system-state generally demand primacy within the display environment. Even in the real-time case the information provided within conventional displays is generally superficial and their display often occurs only after nefarious events (e.g. process usage increases after it has been exploited). It is the purpose of this invention to provide a method and apparatus for providing peripheral information regarding the live state of a computing machine at all times (not just when an issue occurs). In prior work the display represents decision based upon the state of the machine. The present invention intends to provide a direct representation of the underlying machine states so that they may learned and associated with user and system behaviors and so that they can be used as predictive cues by a human operator. The invention does not interpret the hidden states as being benign or malicious, but presents a direct mapping of hidden states into a representation suitable for display in an ambient fashion.

The invention is not limited to computer security applications. Hidden system information can also be represented in order to provide a user with cues regarding relevant internal states of the machine such as whether a process is underway or completed, updates on its active state, and whether there is unexpected contention for system resources.

This invention does not limit the scope of what can be displayed to solely those data or metadata that have a clear semantics. As long as the relationship between state of the machine and the visual, auditory, or kinesthetic display are predictable (i.e. deterministic) then inferred associations can be learned by a human operator. Nonetheless, it is clear that more sophisticated displays can be constructed through the use of natural language processing in combination with event monitoring, state analysis, protocol analysis, and process analysis. These displays should be constructed to provide a peripheral context for the active computing environment, and that providing a peripheral context will enable better decisions regarding threat. The approach requires sophisticated software instrumentation and real-time measurements. The resulting ambient activity monitor should optimally produce displayed representations in real-time as hidden states change.

The Ambient Activity Monitor (AAM) processes data and metadata from various operating system and software components and produces perceptually appealing "projection" or mapping (e.g. visual, auditory, tactile, and kinesthetic) of these data into one of several associated display regions. Generally, this data represents the internal latent and active state of the software and hardware of the computing system.

For example, the data processed by each AAM may represent the state of the computing device or actively running software or process. The "projection" of the data is performed such that it lies to the periphery of the human perceptual system. In this way, hidden system and process metadata is displayed in a way that is unobtrusive, but allows the human perceptual system to learn associations between the AAM and their actions within the computing environment. Deviations from perceptual expectations can then be detected by the human computer operator as perceptual cues which could be acted on directly by a human user. In this way, behavioral modifications based on these cues may prevent, acknowledge, or otherwise act on new and emerging threats (or emerging changes to the underlying computer system which are relevant to the active tasks).

This approach differs significantly from other software instrumentation and security visualization systems (which are exclusively used in a primary display mode) or with existing peripheral display systems (e.g. Mac OS X Dashboard) which display labeled information such as weather or stock prices. The data processed by the AAMs are not information retrieved from online or local information resources for the purposes of "information awareness", but are the current hidden states internal to a computing machine, its computations, and its communication.

AAMs do not display clearly labeled information, but graphical, auditory, haptic, and kinesthetic "graphics" which are associated with and derived from user and system actions and interactions. This aspect of the invention is crucial. If taken out of context of an operating system or software application the AAM would lose its meaning and appear only as abstract (although perhaps still pleasing) shapes, sounds, touch, or movement.

Conventional peripheral "information displays" contain informative icons and numeric values and can be easily understood in any context (e.g. a stock histogram, a current weather display using icons, a news ticker, a conventional software process monitor, etc.).

In this invention the semantics of each AAM are inferred over time and experience by a human operator (e.g. If I go to website X then this pattern appears next to my browser window. If I am led to the wrong website, the pattern is novel and unexpected.). The display of an AAM is carefully designed to be deterministic and predictable and represents a functional mapping between the state of the computing system and the display. The AAM may also be constructed to either accentuate or diminish small differences in the data depending on the intent of the AAM designer. In a diminishing mode the same or similar set of input data may produce similar displayed forms. It should be understood that in order to produce a graphical display which is similar for similar data, that the mapping functions between input data and the AAM will often be mathematically smooth. In an accentuation mode the same or similar set of input data may produce wildly different displayed forms. Depending upon the input data, there may also be mapping functions which introduce large discrete changes for small changes in input data. This would be desired in some instances in order to accentuate and disambiguate data that are mathematically adjacent or are members of an enumerated set (e.g. computer internet protocol ports, similar website domain names).

Each running AAM may operate concurrently in one or more modes which are associated with different views of the computing system hardware, operating system, and software.

A computing system hardware mode may represent information in association with the physical hardware of a computing system. A computing system AAM may represent data flows related to the physical hardware such as voltage variations of electrical connections, the transfer of raw data on a system bus, the usage of physical ports such as Ethernet and Universal Serial Bus, the real-time temperatures of embedded micro-controllers, or the physical usage characteristics of video or system memory.

An operating system mode may be attached to and sit visually or temporally adjacent to the primary view of an operating system (e.g. Microsoft Windows, Apple Mac OS, Linux). The operating system AAM may represent system-wide memory management and swap space characteristics, process scheduling, interrupt requests, network stack and packet characteristics, or other aspects of the operating system which are traditionally hidden.

A software application mode may sit visually or temporally adjacent to a particular application window (or multiple windows belonging to the same application). A software application AAM may represent the various files open by the application; the actual content of an open file; system or function call traces; process and child thread scheduling characteristics; I/O blocking, waiting, write, and read characteristics; network application layer session characteristics;

memory reads and writes; and other aspects of a software application which are traditionally hidden.

A daemon mode may sit visually adjacent to and subtended to the AAM of a parent process (i.e. to an operating system mode AAM or a software application mode AAM).

The AAM need not be pure in respect to which mode of operation it is used. Hardware, operating system, and application AAM modules might mix information from different portions of the hardware and software environment to provide the most effective ambient representations.

FIG. 1 and display two different ways of attaching AAMs to a software application and operating system, respectively. More specifically, FIG. 2 displays AAMs in the Mac OS X windowing environment.

Each AAM could be shown on the same computer monitor, on an adjacent display, or on a hardware peripheral (e.g. tablet computer, haptic device embedded in an office chair, sensiomotor device attached to a user's arm, or any other type of display device). It should be evident that prior advancements in peripheral information displays would enable an AAM display to use any number of different display modalities such as kinesthetic, haptic, tactile, sensiomotor, auditory, visual, olfactory, etc. (e.g. "this website really stinks") Each AAM could be configured to display various levels of granularity in respect to the operating system, process, or software application to which it is attached.

Figure 3:
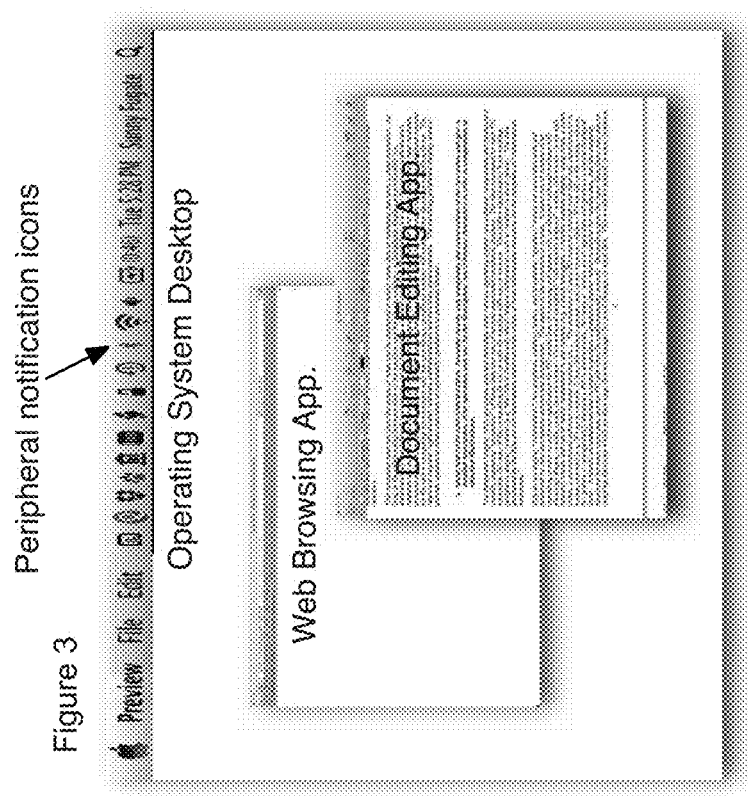
FIG. 3 presents a conventional windowing environment.
Figure 4:
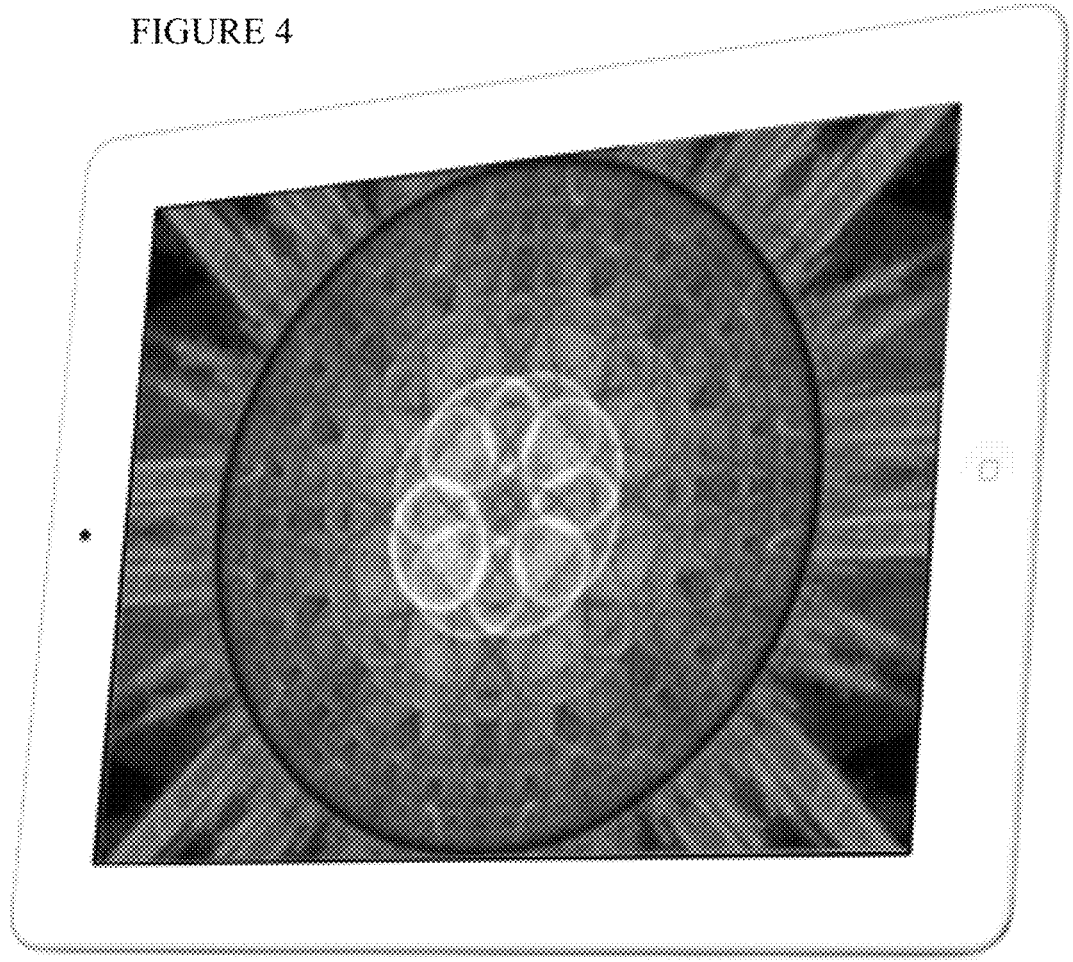
FIG. 4 shows an ambient activity monitor as an external device, namely a tablet computer.

FIG. 3 presents a conventional windowing environment in which the ambient activity monitor is shown on an external device such as a tablet computer, showing peripheral notification icons.

The optimal granularity for a particular AAM may depend upon the data rates of the underlying software or upon human factors testing. Human factors testing may show that certain AAM refresh speeds and AAM granularity are optimal in respect to a) recognition and association of patterns, and b) optimal level of distraction of a user from their primary tasks. The granularity of the display may also be adaptive with the level of experience of a human user, with the amount of data that is passing through a computing system or an individual software process, or the load imposed by the software instrumentation mechanisms being used to collect the hidden system information.

Ideally, the invention is integrated into a conventional operating system environment so that it can access detailed operating system and application data streams without significant system overhead. There are a wealth of widely available and sophisticated system instrumentation and monitoring facilities available within any commodity operating system. These tools provide mechanisms for measuring real-time data flows through software and operating system components, attached peripherals, and communications hardware (e.g. Ethernet cards). Sophisticated system instrumentation, however, is not free. The level of detail being considered for display may need to be tuned to be appropriate to the potential for threat for a particular system in order to minimize overhead costs of performing instrumentation and monitoring. One skilled in the art might also understand that current software instrumentation mechanisms might not be well-suited for use within an AAM. Lightweight instrumentation mechanisms are needed which collect only the specific inputs needed by the AAM. Most commodity instrumentation systems collect broad ranging system statistics and metadata to provide an all-encompassing view of software and system operation for use within debugging and testing. The purpose of an AAM is far simpler in design than these and less sophisticated instrumentation can be used.

FIG. 5 presents conventional computing system hardware. Peripheral devices and their interconnections can be instrumented for display within an AAM.

FIG. 6a presents a block diagram of a simplified computing system architecture and potential data sources on the system data bus. Each "dot" represents a potential AAM data source.

Figure 6B:
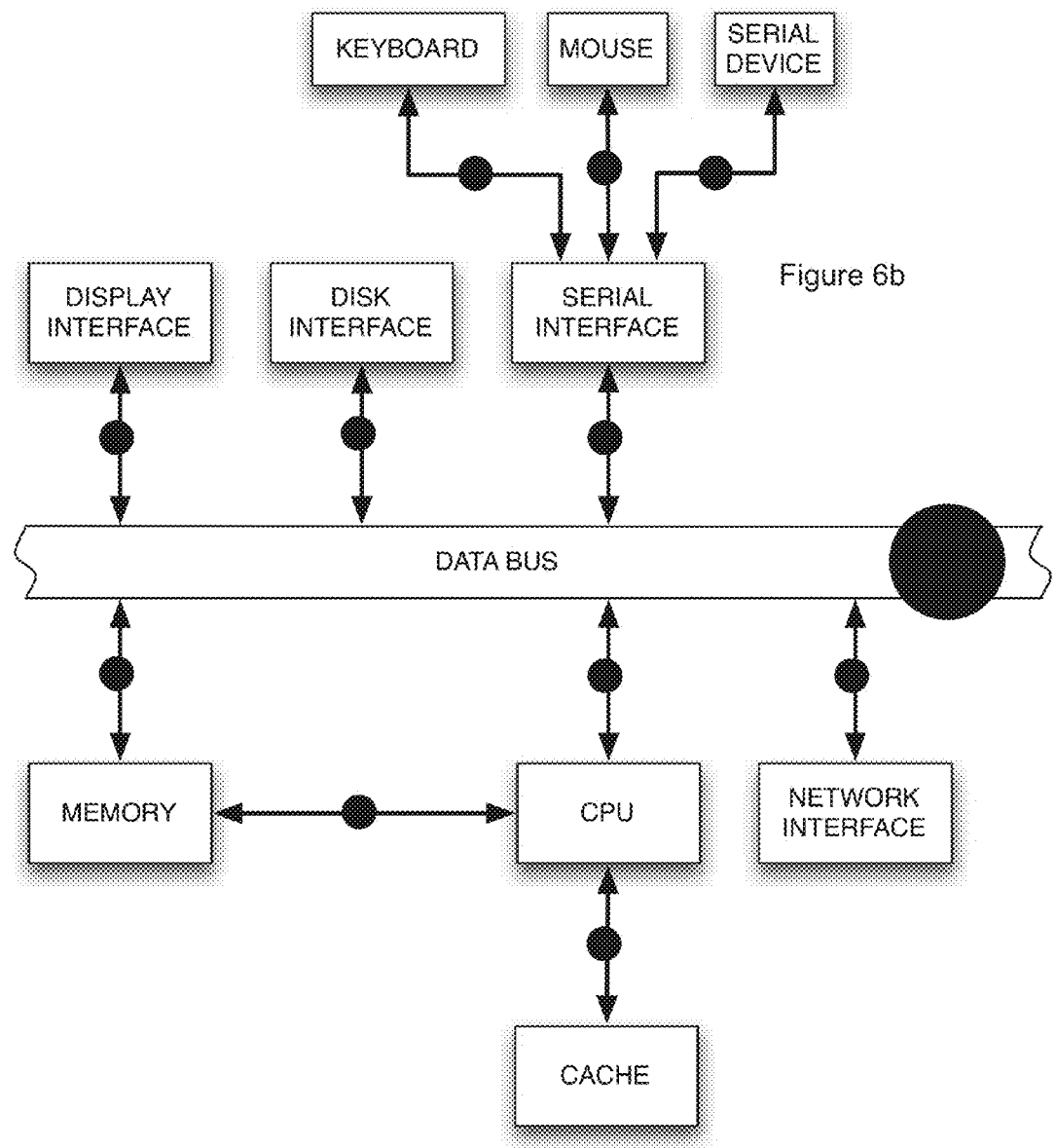
FIG. 6b presents a block diagram of a simplified computing system architecture showing interfaces for various peripheral and internal devices where each black dot represents a potential data source for use by an ambient activity monitor.

FIG. 6b presents a block diagram of a simplified computing system architecture which includes annotation of peripheral devices (keyboard, mouse, and serial devices), a network interface, and interconnections between the CPU and onboard cache and system memory. Each "dot" represents a potential AAM data source.

Figure 7:
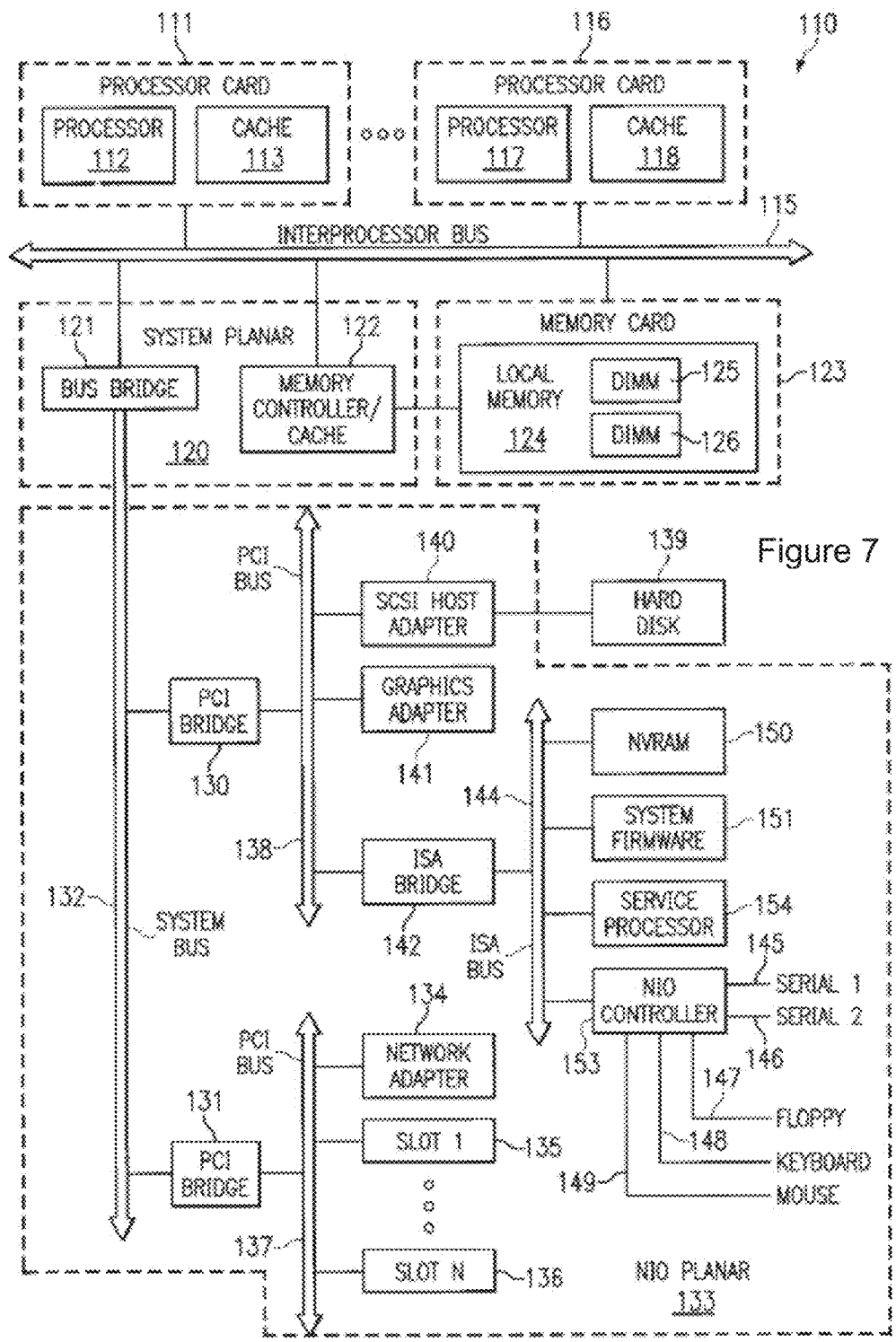
FIG. 7 presents a detailed block diagram of conventional computing system architecture.

FIG. 7 presents a detailed block diagram of a conventional computing system architecture.

Within FIG. 7 any of the component interconnections within the physical configuration of a computing device may be instrumented and monitored and the subsequent data represented within an Ambient Activity Monitor. Some of these devices can be easily monitored using existing instrumentation mechanisms. Some of the devices shows would require modification of the computer system hardware to allow measurements to be used within an AAM.

For example, hard disk accesses (reads and writes) are often displayed within system activity monitors as an event histogram or as aggregate statistics. An AAM might display these same accesses using a similar histogram, but would tie the disk accesses to individual user processes peripherally to the display region of the user process. By ensuring that the disk access AAMs are peripheral to the display of a user process the context can be transparently understood. If a hard disk drive is thrashing due to contention between different processes the AAM will make it evident to a user whether the active task is the culprit. Most other conventional uses of physical system monitoring rely on aggregate statistics do not generally associate the measurements with specific user activities. In an AAM, simply watching an AAM might indicate from which software process the represented measurements originated. In conventional system activity monitors, the aggregate statistics are unlikely to contain sufficient information to indicate from which process the represented measurements originated.

Figure 8B:
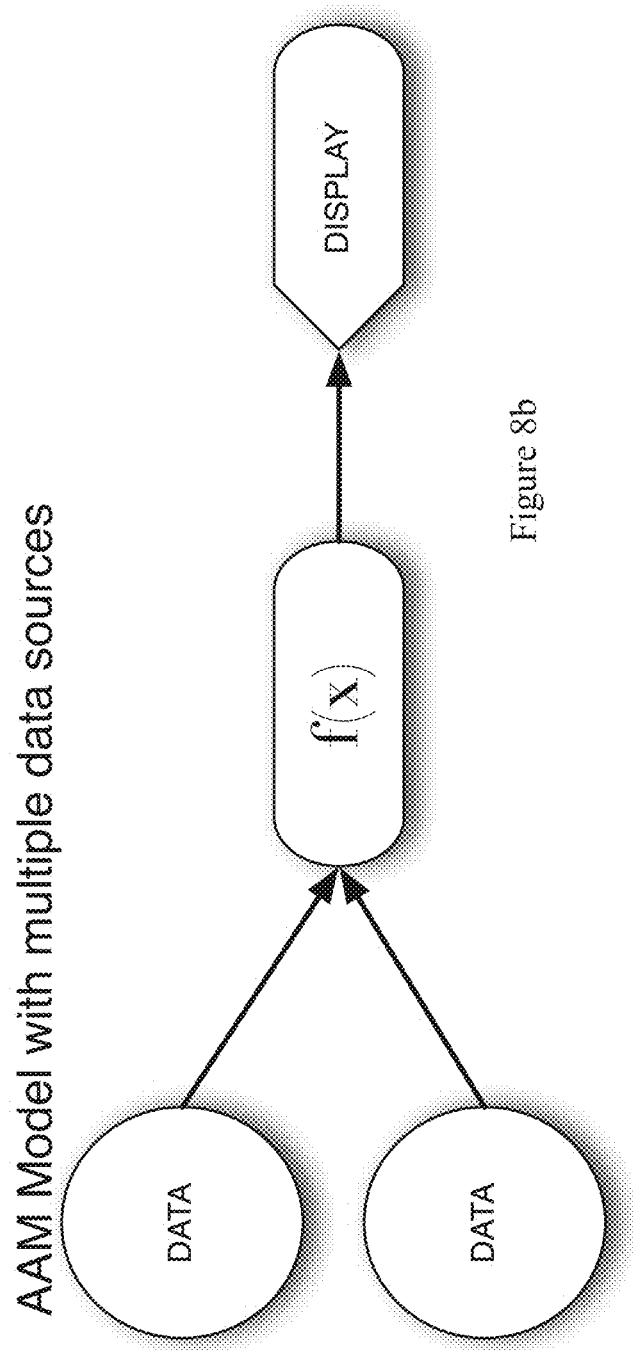

FIGS. 8a, 8b, and 8c present simple functional models of an AAM. Each data source produces data records "x". These records are mapped through a mapping function "f" which maps data records into representation(s) suitable for display.

Figure 9:
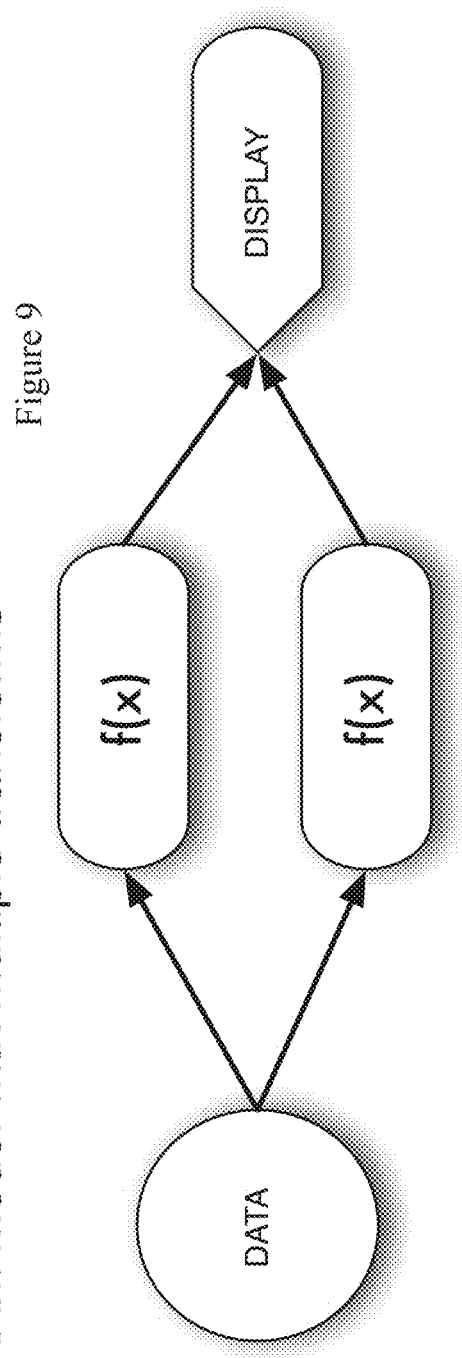

FIGS. 9 and 10 present use of multiple mapping functions.

Figure 11A:
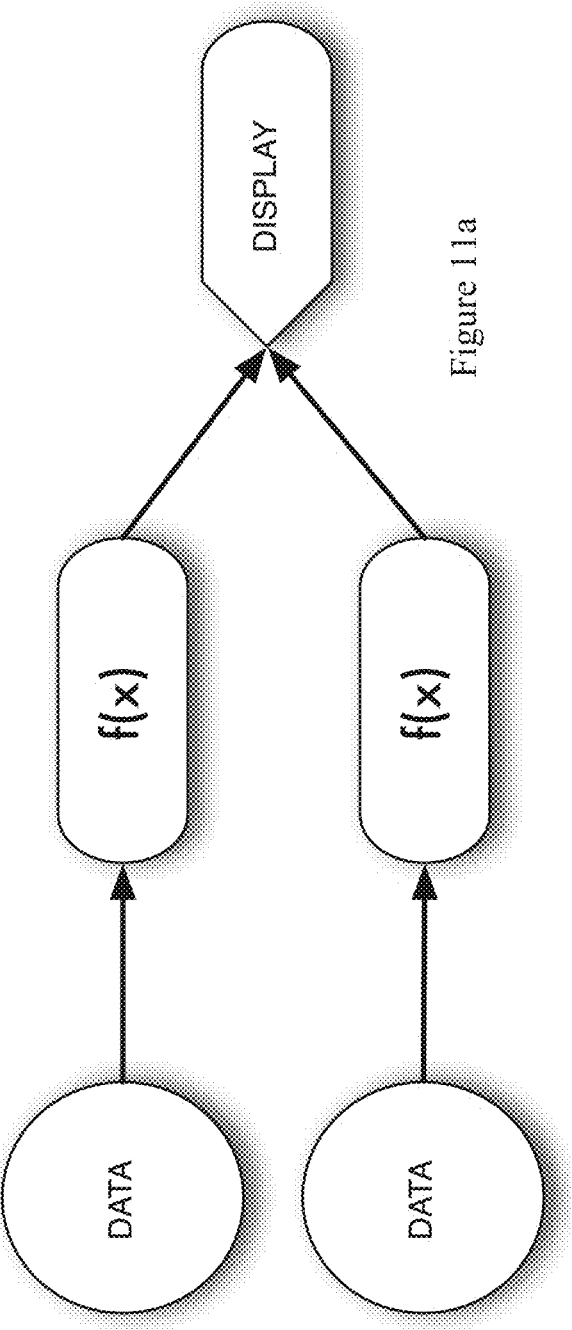
FIGS. 11a and 11b present AAM models with multiple inputs.
Figure 11B:
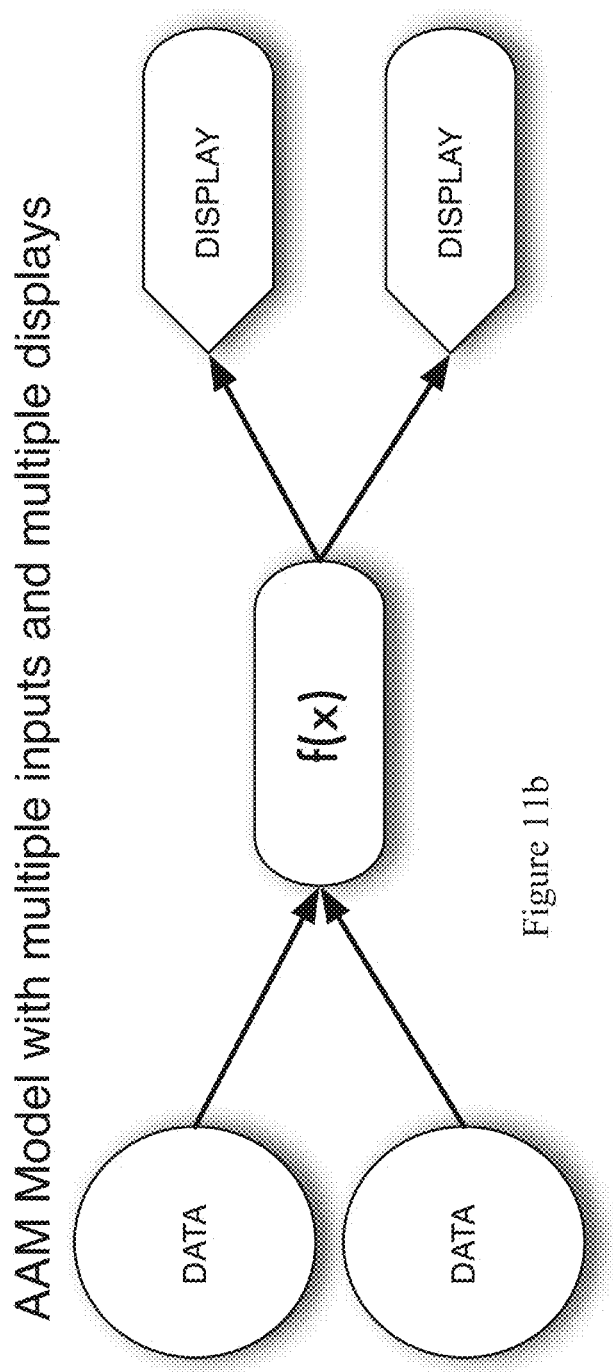

FIGS. 11a and 11b present AAM models with multiple inputs and multiple displays.

Figure 12:
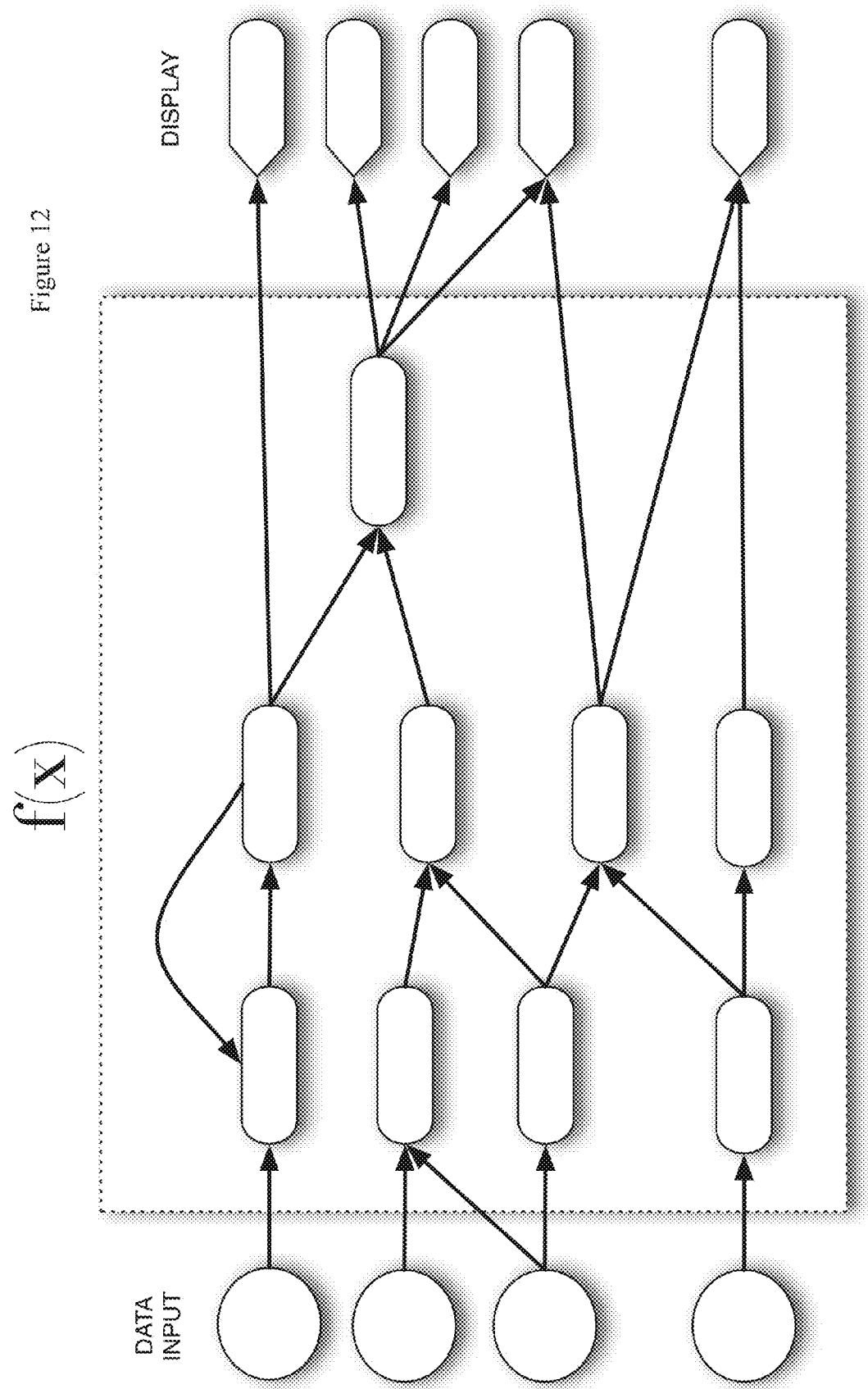
FIG. 12 presents a complex AAM model with many data sources, interdependent mapping functions, and many displays.

FIG. 12 presents a complex AAM model with many data sources, interdependent mapping functions, and many displays.

Figure 2:
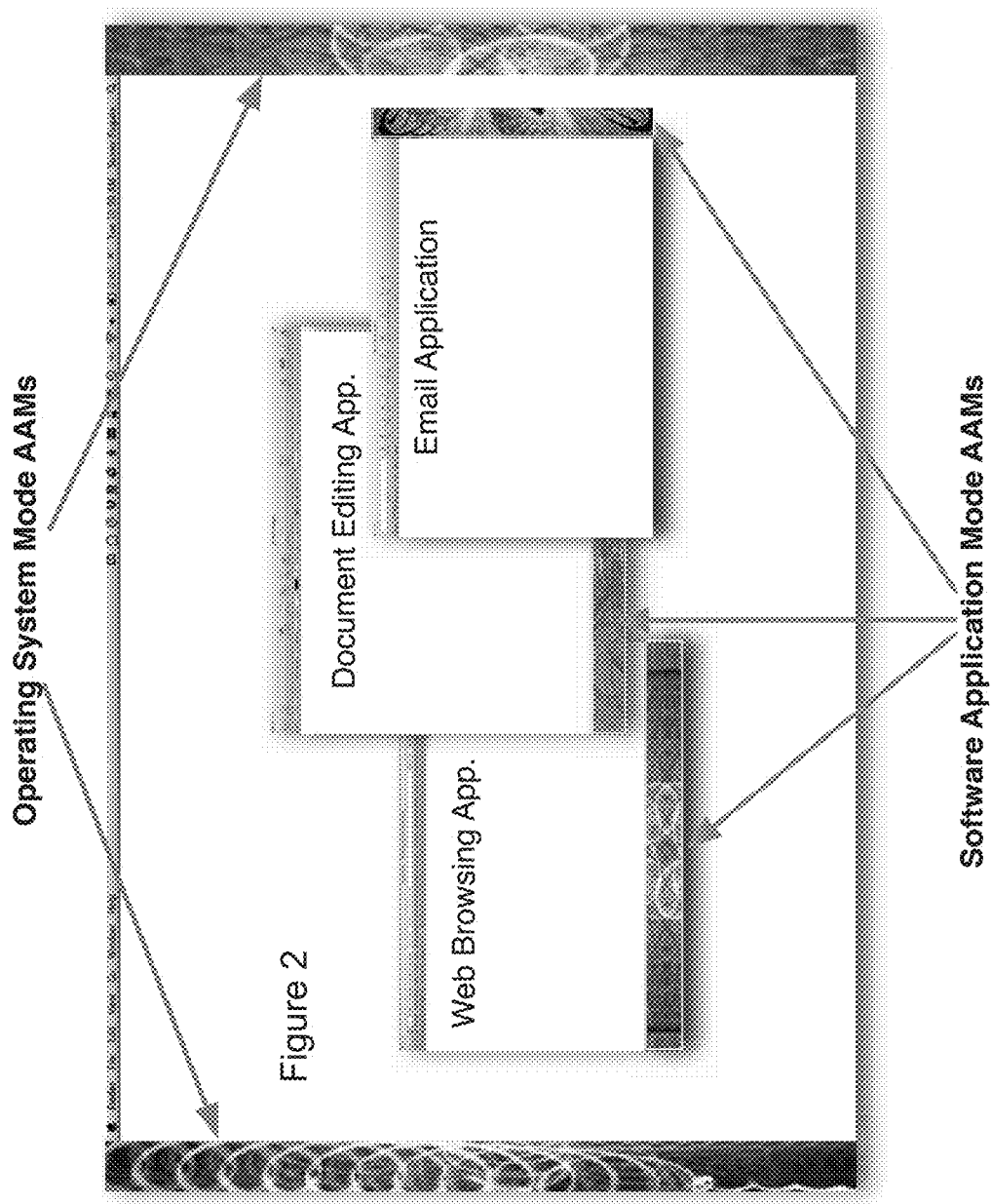
FIG. 2 shows AAMs in the Mac OS X windowing environment.

To summarize, it is essential that: a) an AAM represents underlying system metadata as shown in FIGS. 6a and 6b; b) the representation is displayed in the visual (or sensory) periphery as shown in FIGS. 1 and 2; c) that the mapping between inputs and outputs be deterministic as described and shown in FIGS. 8-12. It is also necessary for the amount of statistical aggregation or granularity of the mapping between inputs (system metadata) and outputs (the AAM itself in the form of audio, visual, kinesthetic, or other display methods) be carefully crafted to optimize correlation between transitions in hidden system information and displayed representation transitions in the AAM.

Generally, for purposes of an AAM aggregation is not desirable. Performing statistical aggregation of system information can result in non-real-time display of state transitions and result in the loss of display fidelity. Statistical aggregation techniques can often result in heavy bias of display output based on large aggregates of prior data. Nonetheless, there are instances where statistical aggregations are desired such as for the purpose of reducing the computing cost of software instrumentation.

Operation of a Preferred Embodiment

Several AAM prototypes have been constructed in order to demonstrate the construction and operation of an AAM system. In one embodiment an AAM is used to display system metadata representing network application layer communication using the Hypertext Transfer Protocol (HTTP) and HTTP Secure (HTTPS) protocols. This "Web-traffic Ambient Activity Monitor" is intended to provide a computer user with a set of visual-auditory cues correlated to their web-browsing activity. The actual AAM display area is shown visually adjacent to the web-browser display area and produces a sequence of visual elements (squares) which vary in size, horizontal location, color, and auditory tone based on the Internet Protocol (IP) source and destination address, source and destination Transmission Control Protocol (TCP) port, and TCP segment size.

Upon initially requesting a web-page using a web-browser a series of packets are transmitted between the client (user's computer) and server (the computer hosting the web-page being requested) and vice-versa. The series of packets transmitted have characteristics which are fairly consistent over time. Each time a user requests the same web-page a similar set of packets will be sent and received. These packets are transmitted in a fairly predictable manner between multiple requests for the same web page. Between TCP request/response sessions there will generally be many small deviations in packet ordering, packet size (due to fragmentation), timing (due to routing), the number of packets sent and received, and other characteristics.

Figure 13:
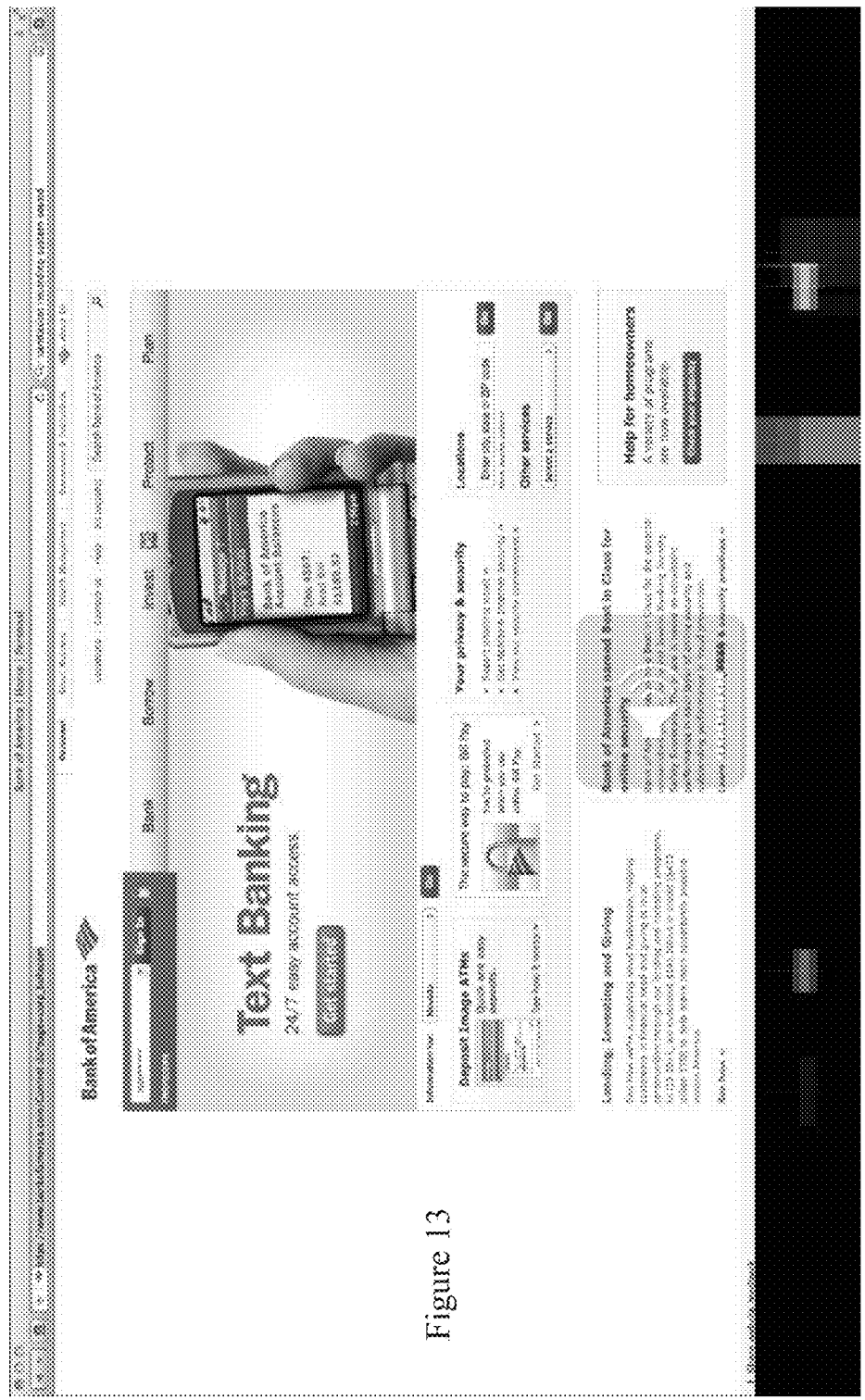
FIG. 13 presents a web-browser window displaying the Bank of America website and an AAM drawn within a horizontal bar beneath the web-browser window.

FIG. 13 presents a web-browser window displaying a Bank of America website and an AAM drawn as a horizontal bar beneath the web-browser window.

Figure 14:
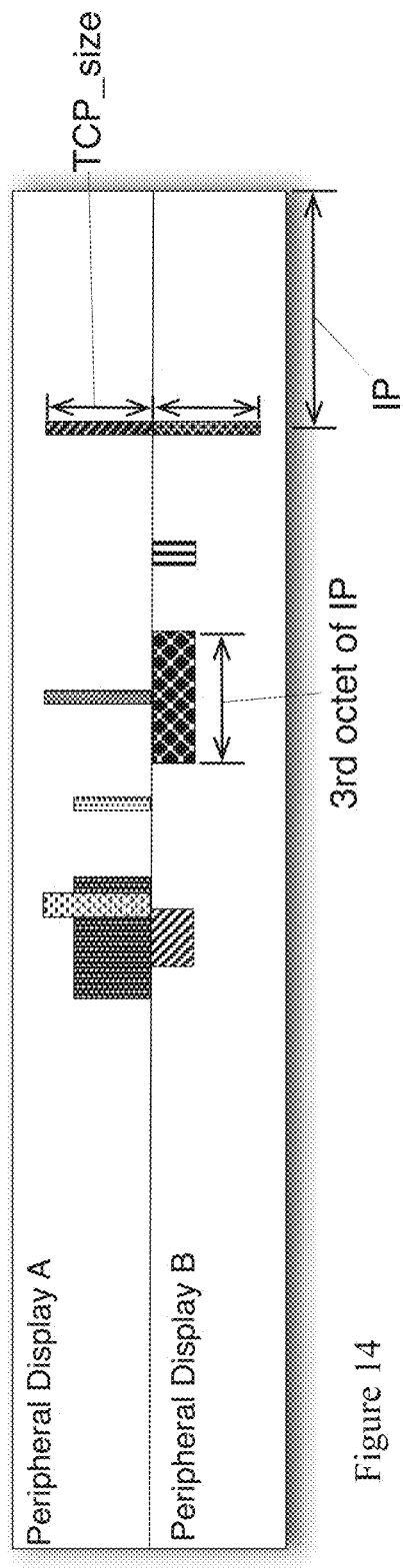
FIG. 14 shows a schematic of the AAM display area for the Web-Browsing Ambient Activity Monitor.

FIG. 14 shows a schematic of the AAM display area for the Web-Browsing Ambient Activity Monitor.

In the embodiment shown by FIGS. 13 and 14, the "Web-Browsing Ambient Activity Monitor" is drawn to the screen in two horizontal regions just below the web-browser window. The source of an IP packet is shown in the top-most AAM (Peripheral Display A) and the destination is shown in the bottom most AAM (Peripheral Display B). The color, horizontal location, width, and auditory tone of a box represents its IP address. The vertical height of a colored box and amplitude of the audio tone each independently represents the TCP segment size. When a user visits a website (such as their banking website) the AAM displays a sequence of colored boxes and the computer's speaker emits a series of audible tones. Each box and each tone each independently represent an HTTP protocol request and response transmitted between the user's web-browser and one or more computer servers which host the content of the webpage.

Figure 15:
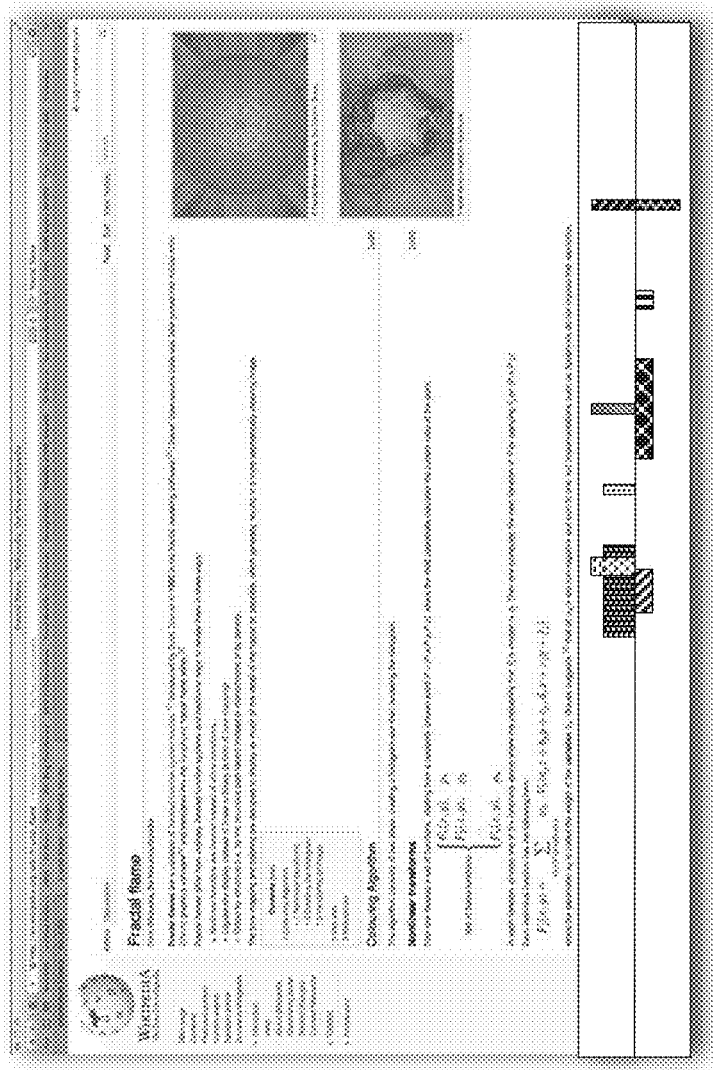
FIG. 15 shows a conventional user interface which is augmented with an AAM.

FIG. 15 shows a conventional user interface which is augmented with an AAM. The AAM shown is the same schematic representation shown in FIG. 14.

In the "Web-Browsing Ambient Activity Monitor" embodiment a conventional method for network packet capture and monitoring is used to capture metadata about the transmission of packets to and from a computer. The metadata collected by the monitoring software is then fed directly into a software translator which maps each metadata value into a visual or auditory display element.

Figure 16:
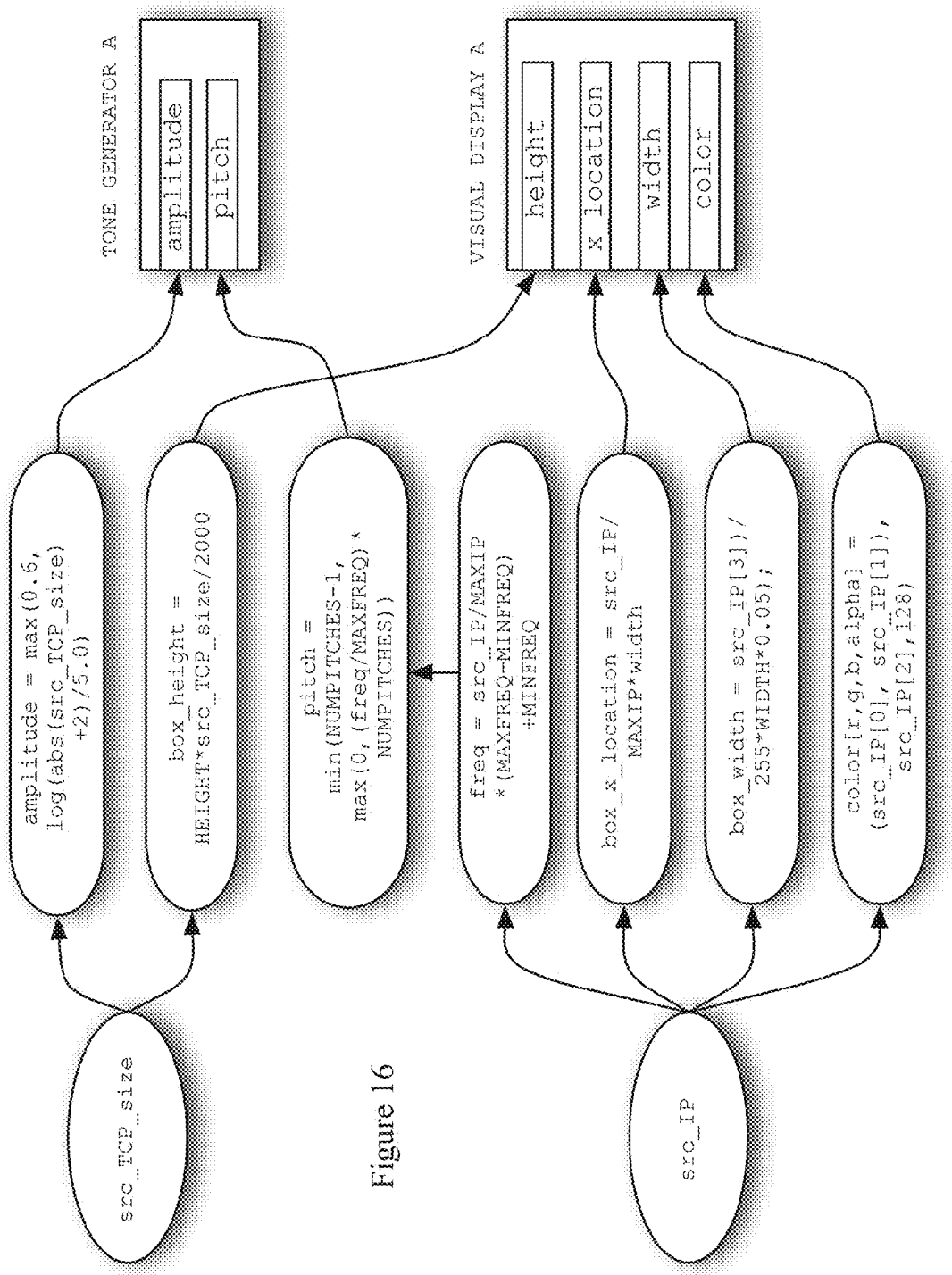
FIG. 16 shows a block diagram of the metadata source, mapping functions, and AAM output for the metadata associated with the network traffic source.
Figure 17:
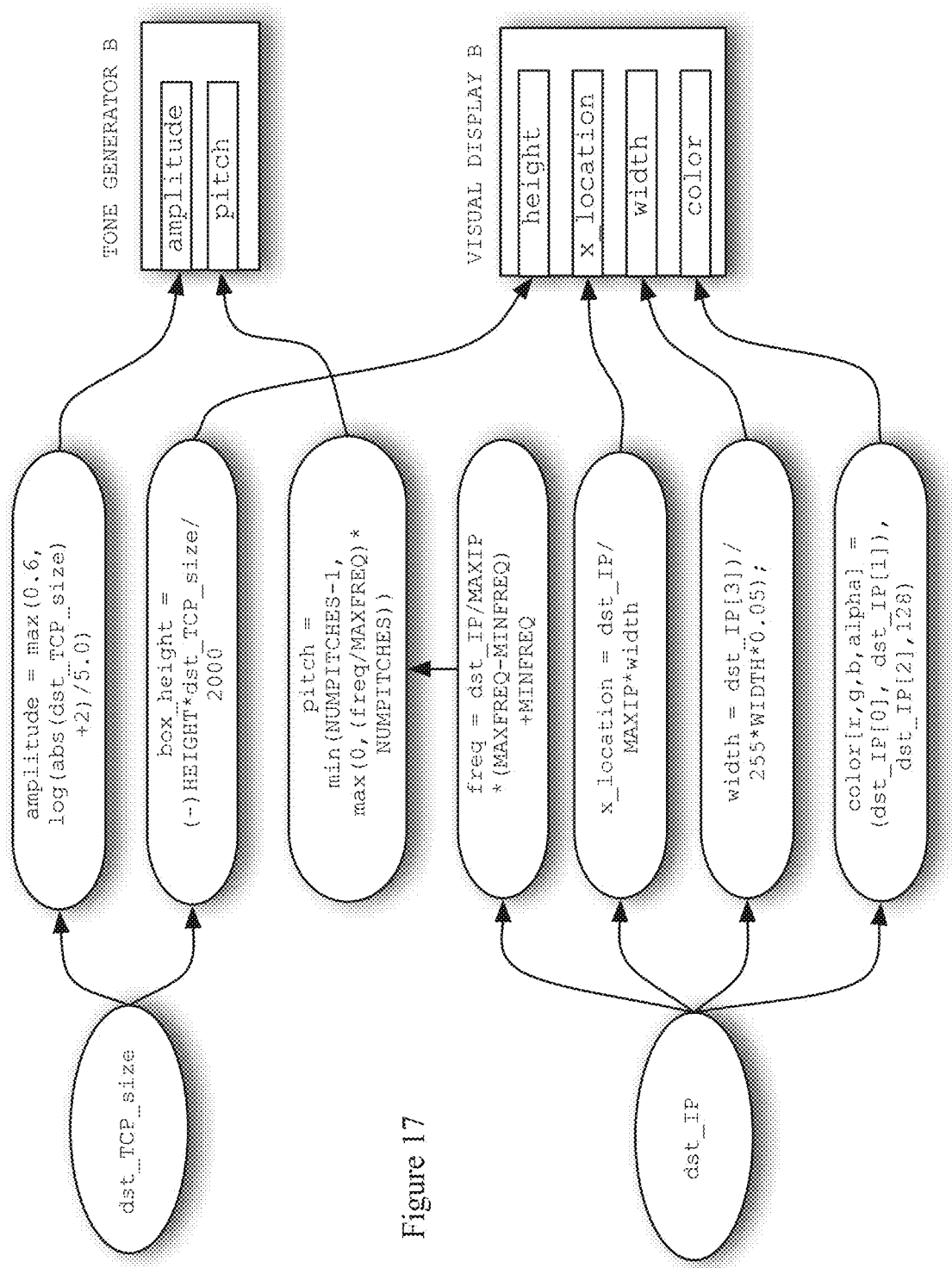
FIG. 17 shows a block diagram of the metadata source, mapping functions, and AAM output for metadata associated with the network traffic destination.

FIGS. 16 and 17 show block diagrams of mapping between system metadata values and AAM display parameters as implemented within the Web-Browsing AAM. More specifically, FIG. 16 shows a block diagram of the metadata source, mapping functions, and AAM output for the metadata associated with the network traffic source. FIG. 17 shows a block diagram of the metadata source, mapping functions, and AAM output for metadata associated with the network traffic destination.

In the instance of this specific embodiment the IP address is mapped to a pitch range on the diatonic scale such that combinations and sequences of tones are generally somewhat pleasing. If the tones were discordant and displeasing, too high in frequency, or two low then they may present a distraction to the user. The pitch range and notes of this embodiment were chosen to be as pleasing as possible while retaining simplicity in their design. Similarly, the visual implementation is intended to be visually pleasing without being distracting. While it is not necessary that an AAM be stimulating or pleasing, it is necessary that the output be acceptable to a user who will be hearing and seeing the AAM's output on a continuous basis. One skilled in the art is able to perform human factors tests to ensure that the chosen AAM implementation works well for most individuals.

In this specific implementation, the software used to map system metadata into visual and auditory output is relatively straightforward. More sophisticated implementations may be necessary for other types of system metadata or AAM output (e.g. haptics, sensiomotor feedback, etc). Various implementations are possible in any number of programming languages.

FIG. 13 presents one possible method of placing the display area so it is adjacent to the primary user interface display area. In one embodiment, the primary user interface display region and the AAM are always shown such that the AAM is perceptually adjacent to the primary user interface display region. However, it is also possible for an AAM to be shown on an external display. This would most often be used for displaying operating-system-level metadata (rather than the application-specific metadata in this specific implementation).

The Web-Browsing Ambient Activity Monitor can be run using a single command-line invocation which runs the metadata collection, metadata translation/mapping, and the graphical and auditory display.

Figure 18:
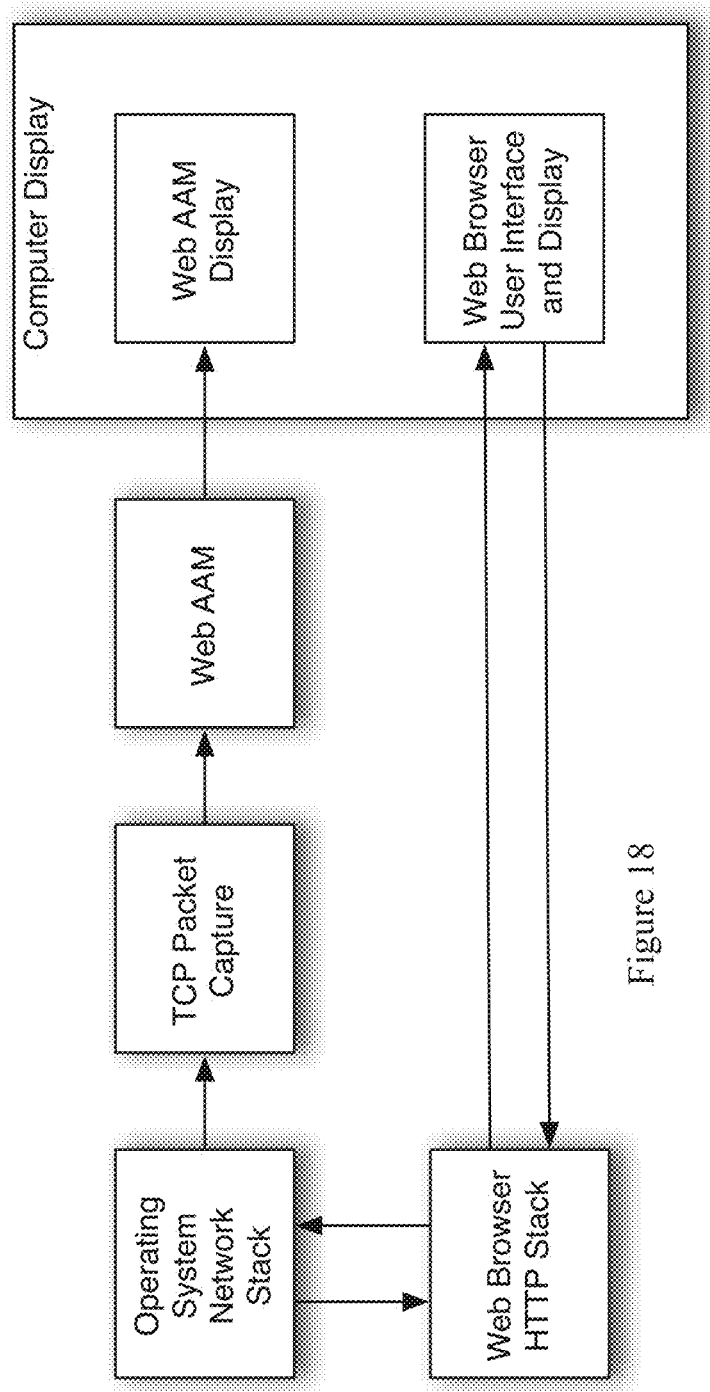
FIG. 18 shows a simplified block diagram of information processing in a computer system where a Web-Browsing AAM is implemented.
Figure 19:
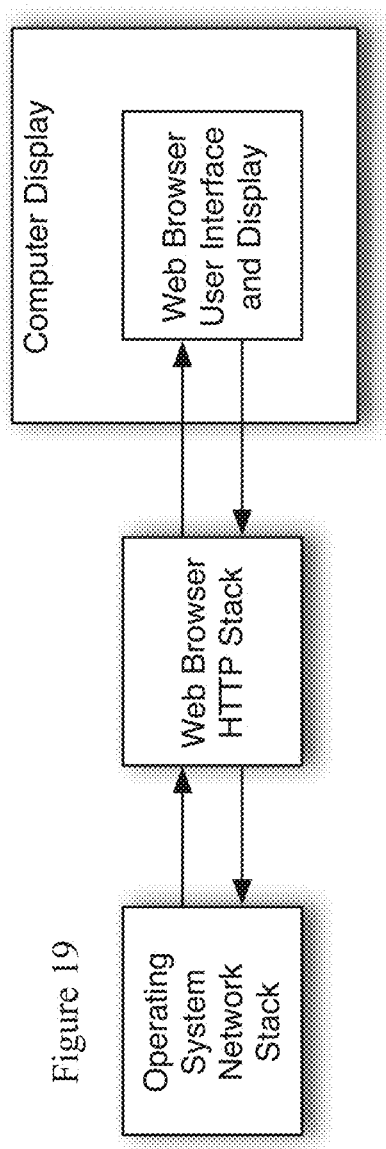
FIG. 19 shows a simplified block diagram of information processing in a computer system Web-Browser without an Ambient Activity Monitor.

FIG. 18 shows a simplified block diagram of the Web-Browsing Ambient Activity Monitor software. It is important to note that a conventional web-browsing experience includes only the interfaces between the Operating System Network Stack, the Web Browser HTTP Stack and the Web Browser User Interface and Display. The AAM invention provides an additional interface to expose low-level system metadata. FIG. 19 shows a simplified block diagram of a system without an Ambient Activity Monitor.

FIG. 18 shows a simplified block diagram of information processing in a computer system where a Web-Browsing AAM is implemented.

FIG. 19 shows a simplified block diagram of information processing in a computer system Web-Browser without an Ambient Activity Monitor.

Although this specific implementation does not utilize it, an AAM can be interactive. Interaction could be via conventional user interface paradigms such as the keyboard and mouse. These interactions could be used to query the AAM for more information about a specific visual or auditory display element. Interactions could also allow a user to control how a given the metadata from a series of system-level events was displayed. For example, if a user visits a specific website many times, but the AAM produces a displeasing or discordant visual or auditory output of the related metadata, the user could click on the AAM display area in order to inform the AAM translation software to produce more pleasing visual and auditory output. Very minimal changes would be required to implement this capability in the Web-Browser Ambient Activity Monitor.

Figure 20:
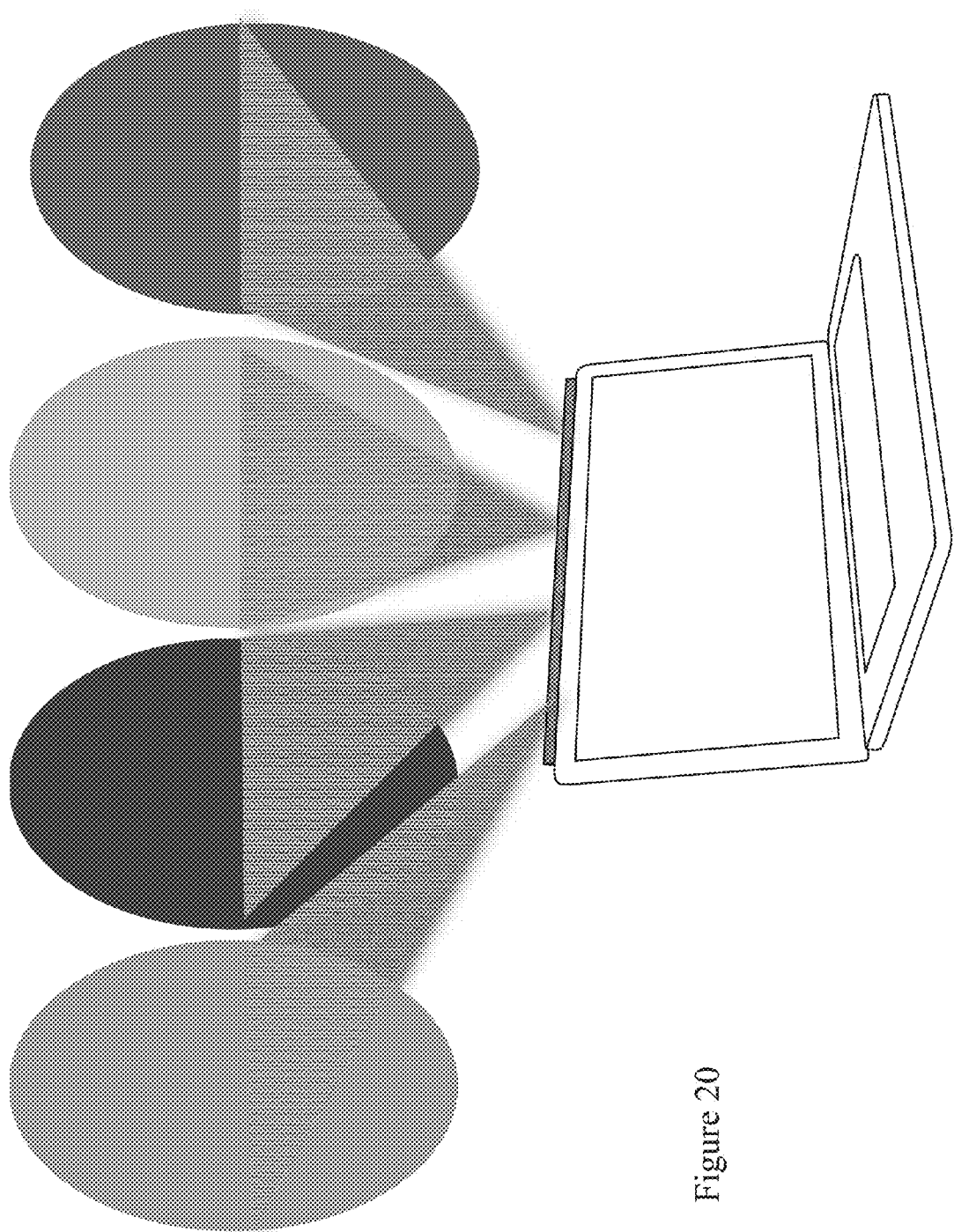
FIG. 20 shows a computer laptop using an Ambient Activity Monitor display using an array of LED which project a pattern of colored lights behind the laptop display.

FIG. 20 shows an embodiment in which the Ambient Activity Monitor display is shown using an array of LED display device which is connected to a computing system as an output device. In this embodiment the functional mapping between hidden system information and the AAM maps system changes into an intensity, color, location, and pattern of colored lights which are projected on the wall or office space in front of a user (and behind the display).

Figure 21:
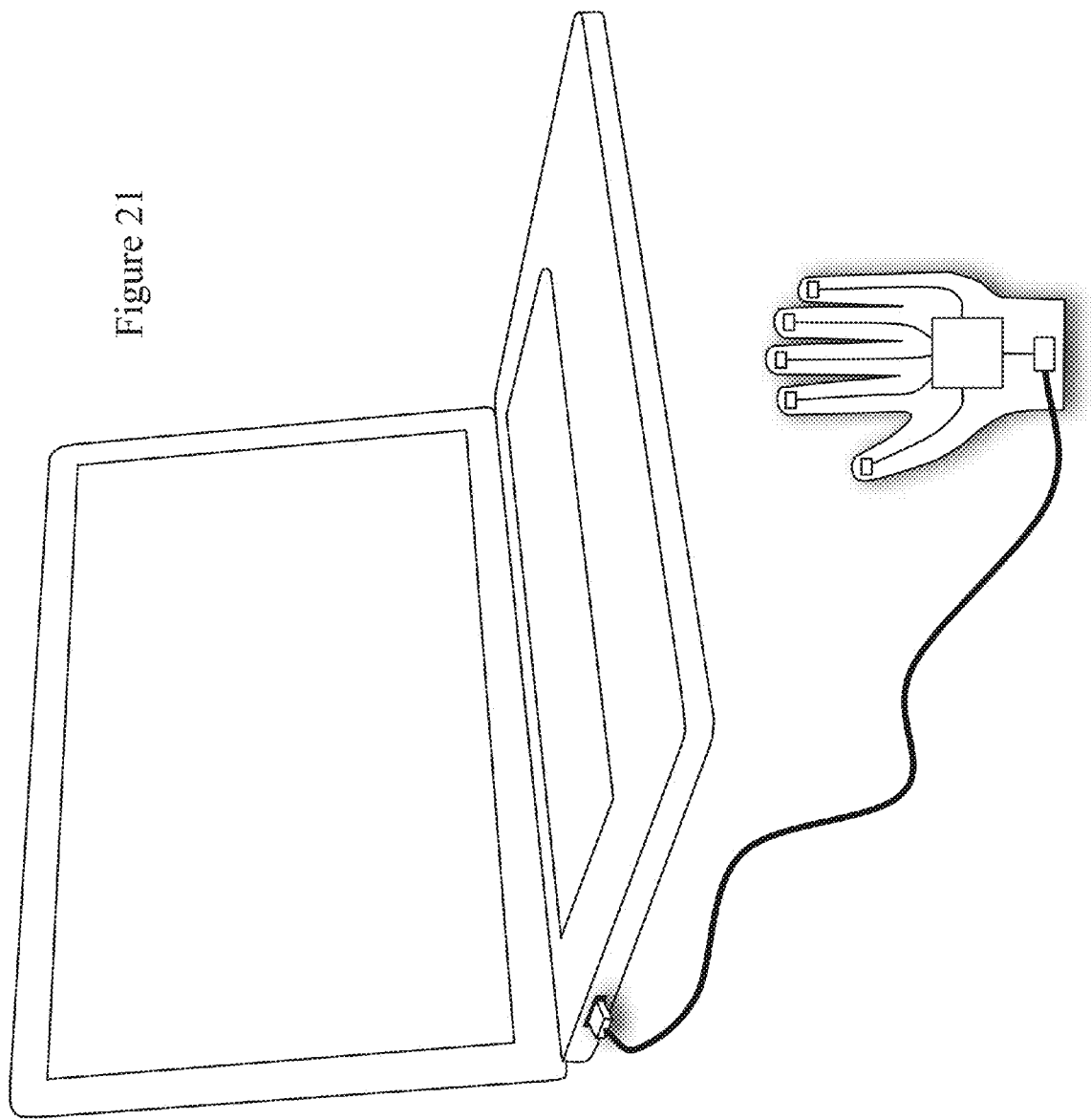
FIG. 21 shows an AAM which uses an electronic glove as a haptic display attached to a user's hand.

FIG. 21 shows an AAM which uses a haptic device which is connected to the computing system as an output device. In this embodiment the haptic device is directly attached to a user's hand. The hidden system information is mapped to the amplitude, frequency, location, and pattern of haptic activations on a user's hand. Haptic devices could easily be constructed which are attached to other regions of the body. Haptic AAM output devices may also be embedded within clothing or attached to furniture such as desks or chairs. Haptic AAM output devices can also be embedded within computing devices such as the vibration motors commonly embedded within personal electronic devices and wireless telephones.

Figure 22:
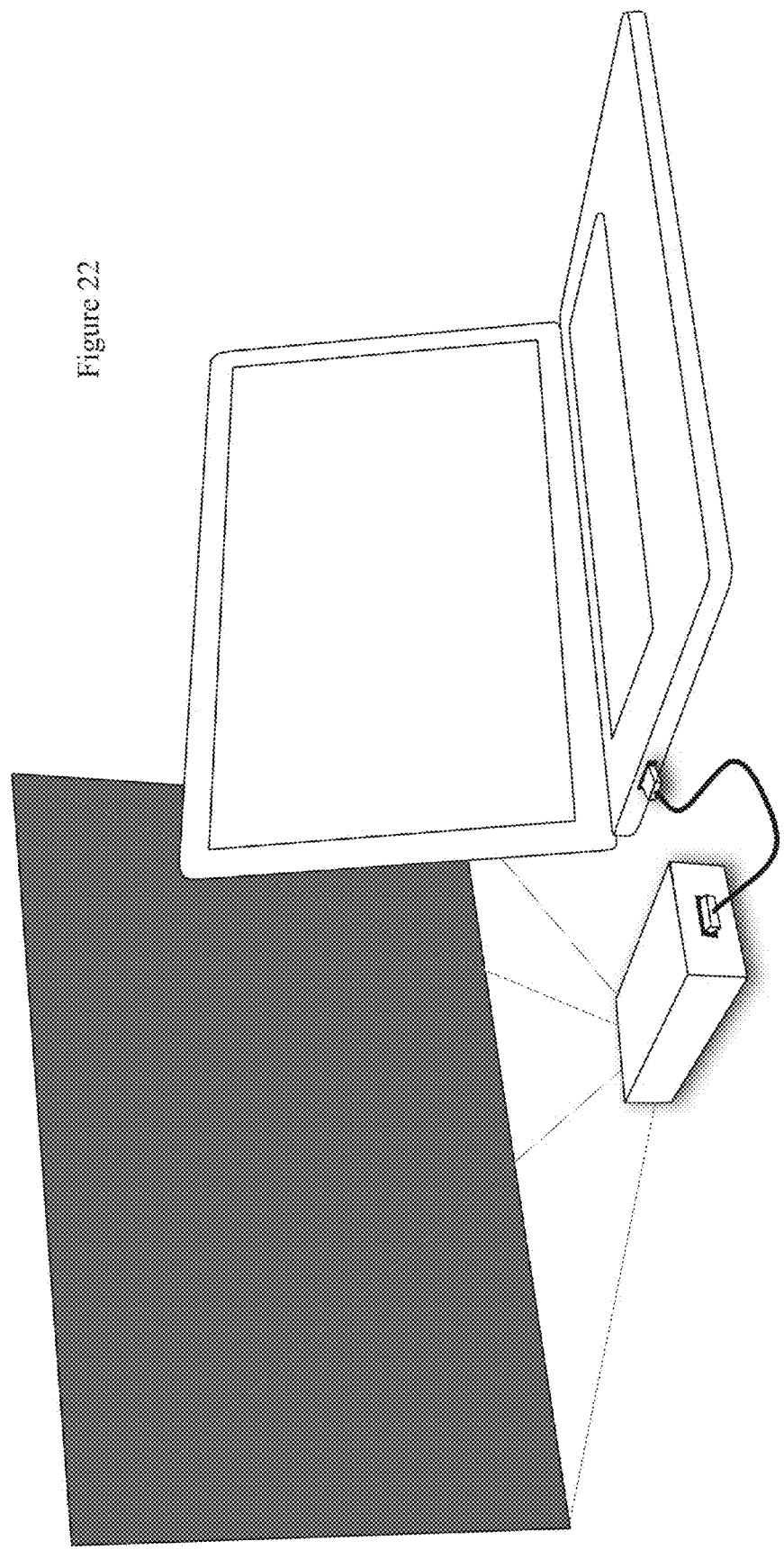
FIG. 22 shows an AAM which uses a digital projector as the AAM display.

FIG. 22 shows an AAM which uses a digital projector which is attached to the computing system as an output device. In this embodiment hidden system information is displayed visually as sequences and patterns of visual imagery on a wall or within the office space of a user. The digital projector may be embedded within the computing system primary display or attached to the primary display as in FIG. 20. The screen resolution of a digital projector is quite high compared to the LED display of FIG. 20 and may show representations of hidden system information with greater fidelity.

There are several significant differences between this invention and state-of-the-art peripheral information displays seen within commodity operation systems or in industry or academic research. One primary difference is that this invention serves to display underlying meta-data which concerns the active state of network connections, of software applications, and of operating system states.

There exists many systems which display such information, but no known systems represent this information in the form of a peripheral (supplemental) display. There exists a wealth of process and system monitoring software which displays aggregate system information as peripheral information displays (graphs or numeric values).

However, this invention is not a visualization of aggregate system data, but a mapping of real-time system and software states onto a visual representation which can be used by a human user to predict future states (and to detect differences between their prediction and the displayed state). It is the combination of the intent of this invention (utilizing human cognition to predict system behavior and correlate it with their own interactions with a computing system), the functional mechanism (directly mapping system metadata through predictable and deterministic transformation functions), and the display methodology (display of representations in an ambient fashion with the intent of being unobtrusive and visually appealing) which is innovative.

The invention provides the following advantages over existing methods:

There are many software display systems which represent system metadata, but do so while using the principal display. These systems are not peripheral and their displays are not ambient. Examples include system performance monitors, process monitors, and system instrumentation consoles. These systems are not intended or designed for use within the visual or sensory periphery nor are they intended for common computer operator use. Most of these types of instrumentation and display systems also perform substantial aggregation and interpretation of system metadata in order to make the displays compact and to convey meaning immediately and independently of current user activities. Prior art systems convey meaning directly through the display of a measurement of some system activity metric in the context of previous measurements. This differs substantially from the present invention, which displays a measurement of a system activity only in the context of the active task being performed by the user.

There also exist prior systems which represent system metadata directly and in a non-aggregate fashion. Examples include some process monitors, system instrumentation consoles, and software debuggers. However, no known system which displays non-aggregate system metadata is configured to use the visual or sensory periphery in the way described in this invention. These systems are intended and designed to be used within the primary display and could not function as currently designed as AAMs. Such systems are generally used by software developers or by system administrators and are generally unsuitable for common computer operators.

Other existing systems both use the sensory periphery and display non-aggregate information. Examples include: weather displays, stock tickers, news tickers, and artistic displays. However, none of these systems display system metadata. While these types of information displays are used by common computer operators they are not tied to system metadata and cannot currently function as AAMs.

The invention as disclosed provides: representation of system metadata; display of this metadata in the visual, sensory, or temporal periphery; the use of a non-obtrusive and non-distracting representation; association of the representation with an active task of a human user; and use of a non-aggregate, deterministic mapping from input metadata to output display representation.

Various software instrumentation mechanisms are found in the literature. Many of these would be capable of collecting and providing the data necessary for creating Ambient Activity Monitors for Hidden Computing System and Process Metadata.

Many visualization approaches are possible with AAMs. It is not the purpose of this invention to provide all possible mechanisms of representing system metadata. The best possible representation is dependent upon the type of data being represented, various aspects of the human perceptual system, and the predictions which might are expected to be made by a computer user. Each data being represented will require careful design and substantial human factors testing.

Iconic representations are not disallowed within an AAM nor are statistical aggregations. In some cases, the use of iconic representations or statistical aggregations can assist in peripheral or active perception. The invention is not dependent upon not being an aggregated display or an iconic display. It is only essential that the AAM represents underlying system metadata in the periphery and in a dependable and deterministic manner.

An interesting extension of this invention would be to use the AAMs to perform monitoring of human interactions and perceptual queues. By turning the instrumentation mechanisms outward and monitoring the human operator, some of the AAMs being seen by the operator reflect measurements of their own state and interactions. This would represent a form of bio-feedback, but would be displayed in the context of their current task.

For example, the operator of a remotely piloted vehicle could receive information about their attentiveness in the context of the current task. If they perceive peripherally that their attention is elsewhere or different than when normally performing the same task they might search for a cause (lack of stimulation, lack of sleep, environmental disturbances, etc).

This invention relates to a method for displaying hidden internal states of software and hardware. When a user interacts with a specific computing application a set of software instrumentation mechanisms are activated which are used to display hidden states of the application. When the user changes their interaction behavior or when the software application changes the way that it is processing raw data inputs the hidden internal states of the software are modified. The software instrumentation mechanism measures these changes and the display mechanism immediately displays representations of new interaction behavior and new input data as they are measured by the software instrumentation mechanisms. Preferably the display presents the information collected via software instrumentation in the user's peripheral vision so as not to distract from the user's interaction with the application. Preferably the displayed representation does not interpret the internal states but instead provides a direct mapping from internal states to a visual, haptic, tactile, or other display representation. Unexpected variations in hidden internal states of software applications can then be detected by a user who is actively interacting with a software application but only peripherally aware of the displayed representation of these states.

From the above description, it is apparent that various techniques may be used for implementing the concepts of the present invention without departing from its scope. The described embodiments are to be considered in all respects as illustrative and not restrictive. It should also be understood that the present invention is not limited to the particular embodiments described herein, but is capable of many embodiments without departing from the scope of the claims.

What is claimed is:

1. A method comprising the steps of:
measuring one or more hidden states internal to a computing system related only to a user's active task with the computing system;
using one or more deterministic mapping functions to directly map, without interpretation of the hidden states as being benign or malicious, the measurements to a representational output; and
presenting the representational output in real-time and peripheral to the user's active task with the computing system, wherein the presented representational output does not label information pertaining to the hidden states.

2. The method of claim 1, wherein the hidden states are hidden states of a software application running on the computing system.

3. The method of claim 2, wherein a hidden state of the software application comprises whether or not the software application is underway or completed.

4. The method of claim 2, wherein a hidden state of the software application comprises an update on the active state of the software application.

5. The method of claim 2, wherein a hidden state of the software application comprises whether there is an unexpected contention for system resources of the computing system.

6. The method of claim 1, wherein the hidden states are hidden states of hardware of the computing system.

7. The method of claim 6, wherein the step of measuring one or more hidden states internal to a computing system comprises measuring data flows related to the hardware of the computing system.

8. The method of claim 7, wherein the data flows comprise one or more of data flows related to voltage variations of electrical connections, transfer of raw data on a system bus, usage of Ethernet and Universal Serial Bus ports, real-time temperatures of embedded micro-controllers, and usage characteristics of video or system memory.

9. The method of claim 1, wherein the hidden states are hidden states of an operating system of the computing system.

10. The method of claim 9, wherein the step of measuring one or more hidden states internal to a computing system comprises measuring one or more of system-wide memory management and swap space characteristics, process scheduling, interrupt requests, and network stack and packet characteristics.

11. The method of claim 1, wherein the step of presenting the representational output comprises visually presenting the representational output.

12. The method of claim 11, wherein the step of visually presenting the representational output comprises graphically depicting the representational output on a display peripheral to a portion of the display devoted to the user's active task with the computing system.

13. The method of claim 12, wherein the graphical depiction comprises at least one of a color and a shape.

14. The method of claim 11, wherein the step of visually presenting the representational output comprises displaying the representational output on a display external to a display devoted to the user's active task with the computing system.

15. The method of claim 11, wherein the step of visually presenting the representational output comprises displaying the representational output in the user's environment external to a display devoted to the user's active task with the computing system.

16. The method of claim 1, wherein the step of presenting the representational output comprises presenting the representational output auditorily.

17. The method of claim 1, wherein the step of presenting the representational output comprises presenting the representational output on a haptic device.

18. The method of claim 1, wherein the presented representational output changes when the user's active task with the computing system changes.

* * * * *